United States Patent
Kimura et al.

(10) Patent No.: US 10,587,764 B2
(45) Date of Patent: Mar. 10, 2020

(54) PRINT MANAGEMENT SYSTEM, PRINT MANAGEMENT METHOD, AND STORAGE MEDIUM TO REFINE OPERABILITY FOR PAPER SETTING OPERATIONS

(71) Applicant: CANON KABUSHIKI KAISHA, Tokyo (JP)

(72) Inventors: Yusuke Kimura, Abiko (JP); Yuzo Harano, Sagamihara (JP); Hideaki Ooba, Yokohama (JP); Aya Ito, Tokyo (JP); Junichi Yamakawa, Kashiwa (JP); Nobuhiro Kawamura, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/026,613

(22) Filed: Jul. 3, 2018

(65) Prior Publication Data
US 2019/0020771 A1    Jan. 17, 2019

(30) Foreign Application Priority Data
Jul. 11, 2017  (JP) ................. 2017-135497

(51) Int. Cl.
| H04N 1/00 | (2006.01) |
| G06F 3/12 | (2006.01) |
| G06K 15/00 | (2006.01) |
| G03G 15/00 | (2006.01) |
| G06F 3/0486 | (2013.01) |

(52) U.S. Cl.
CPC ..... *H04N 1/00395* (2013.01); *G03G 15/6508* (2013.01); *G06F 3/1208* (2013.01); *G06F 3/1252* (2013.01); *G06F 3/1256* (2013.01); *G06F 3/1274* (2013.01); *G06K 15/4065* (2013.01); *G06F 3/0486* (2013.01); *G06F 3/1253* (2013.01); *H04N 1/00411* (2013.01); *H04N 1/00604* (2013.01); *H04N 2201/0094* (2013.01)

(58) Field of Classification Search
None
See application file for complete search history.

(56) References Cited

U.S. PATENT DOCUMENTS

| 6,304,732 B1* | 10/2001 | Myers .............. G06F 17/212 |
| | | 399/391 |
| 2010/0046977 A1* | 2/2010 | Inenaga ........... H04N 1/00408 |
| | | 399/81 |
| 2013/0329256 A1* | 12/2013 | Fukuda ............ G06K 15/4065 |
| | | 358/1.15 |

(Continued)

FOREIGN PATENT DOCUMENTS

JP    201049167 A    3/2010

*Primary Examiner* — Miya J Williams
(74) *Attorney, Agent, or Firm* — Canon U.S.A., Inc. IP Division

(57) ABSTRACT

A print management system includes an image forming apparatus and a control apparatus, and includes a detection unit, a display unit, and a setting unit. The detection unit detects paper information which is set with respect to a print job. The display unit displays the paper information detected by the detection unit on a display device. The setting unit controls processing for displaying a setting screen used to allocate the paper information displayed on the display device to a paper feed stage of the image forming apparatus on a screen of the display device.

14 Claims, 16 Drawing Sheets

(56) References Cited

U.S. PATENT DOCUMENTS

2014/0023418 A1* 1/2014 Kashiwagi ........... G03G 15/502
399/410
2014/0153014 A1* 6/2014 Kaneda .............. H04N 1/00448
358/1.12

* cited by examiner

FIG.4B

TOP SCREEN — 401

DEVICE | ADJUSTMENT — 403, 404

- IMAGE POSITION ADJUSTMENT
- CURL CORRECTION
- ADJUSTMENT OF SADDLE FOLDING POSITION
- ADJUSTMENT OF CREEP CORRECTION AMOUNT
- ADJUSTMENT OF SADDLE STITCH FOLDING POSITION
- SADDLE STITCH POSITION CHANGE
- ADJUSTMENT OF SECONDARY TRANSFER VOLTAGE
- ADJUSTMENT OF LEADING EDGE PORTION SECONDARY TRANSFER VOLTAGE
- ADJUSTMENT OF SECONDARY TRANSFER DESTATICIZING BIAS
- ADJUSTMENT OF PRIMARY TRANSFER VOLTAGE
- ADJUSTMENT OF GLOSSINESS/BLACKNESS QUALITY

418 — PAPER LIST

419

- ADJUSTMENT NOT APPLIED
- ADJUSTMENT NOT APPLIED
- 0 mm
- 0 mm
- 0 mm
- ADJUSTMENT NOT APPLIED
- ADJUSTMENT NOT APPLIED
- ADJUSTMENT NOT APPLIED
- ADJUSTMENT NOT APPLIED
- ADJUSTMENT APPLIED

420

414 — 415

| NAME / SIZE | GRAMMAGE |
|---|---|
| PLAIN PAPER / A4 | 100 gsm |
| DOUBLE-SIDED COATED PAPER / A4 | 105 gsm |
| SINGLE-SIDED COATED PAPER / A4 | 105 gsm |
| OHP PAPER / A4 | 80 gsm |
| RECYCLED PAPER / A4 | 200 gsm |
| TRANSPARENT PAPER / A4 | 80 gsm |
| COLORED PAPER / A4 | 127 gsm |
| HEAVY PAPER / A4 | 300 gsm |
| SINGLE-SIDED COATED PAPER / A4 | 105 gsm |
| OHP PAPER / A4 | 80 gsm |
| RECYCLED PAPER / A4 | 200 gsm |

416

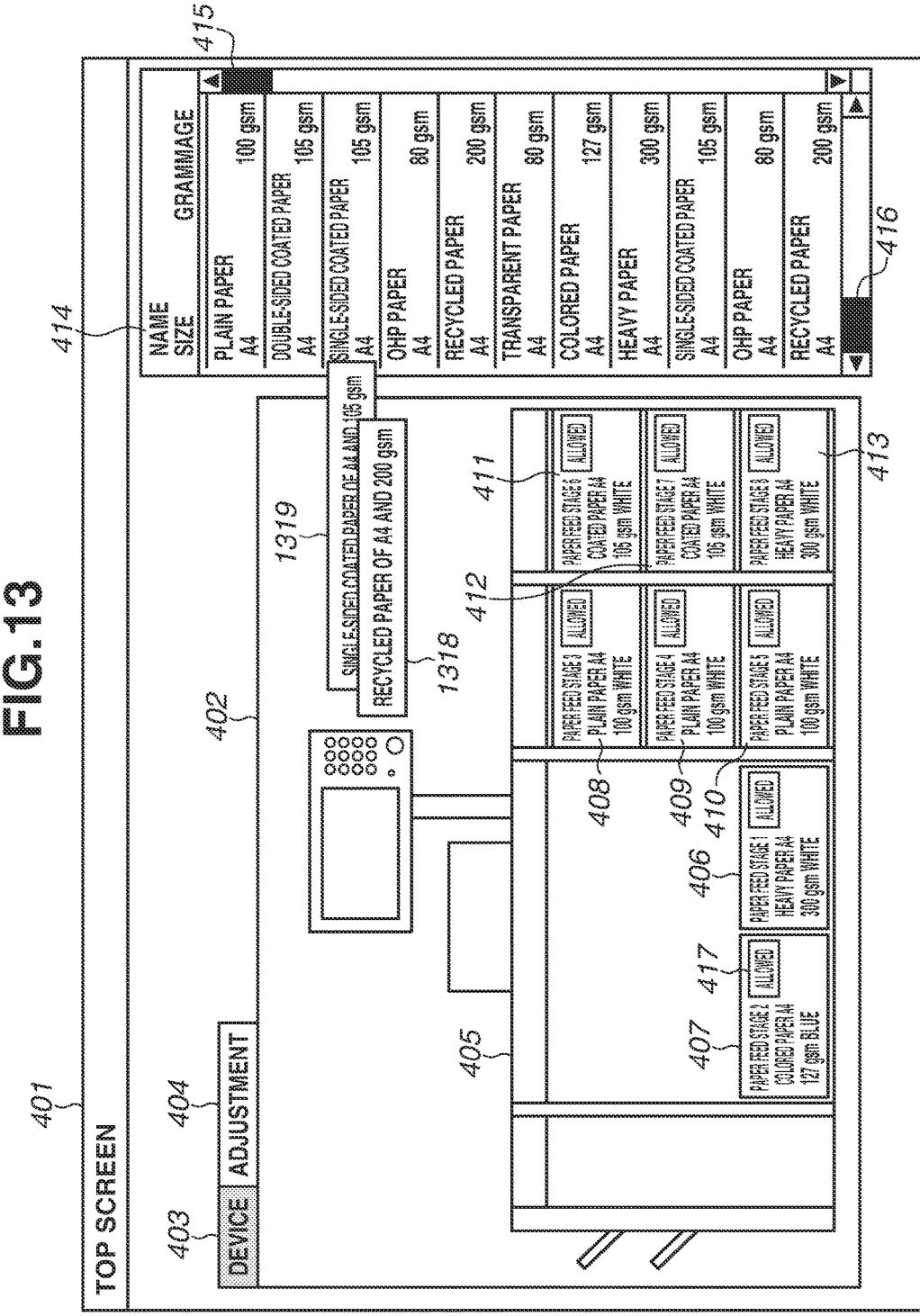

FIG.14A

| OCCURRENCE ORDER | PAPER ID | JOB ID | ~1400 |
|---|---|---|---|
| 1 | 0004 | 0001 | |
| 2 | 0002 | 0001 | |
|  |  |  | |

FIG.14B

| OCCURRENCE ORDER | PAPER ID | JOB ID | ~1410 |
|---|---|---|---|
| 1 | 0002 | 0001 | |
|  |  |  | |
|  |  |  | |

FIG.14C

| OCCURRENCE ORDER | PAPER ID | JOB ID | ~1420 |
|---|---|---|---|
| 1 | 0004 | 0001 | |
| 2 | 0002 | 0001 | |
| 3 | 0004 | 0002 | |

FIG.14D

| OCCURRENCE ORDER | PAPER ID | JOB ID | ~1430 |
|---|---|---|---|
| 1 | 0004 | 0001 | |
| 2 | 0002 | 0002 | |
| 3 | 0004 | 0003 | |

FIG.14E

| OCCURRENCE ORDER | PAPER ID | JOB ID | ~1440 |
|---|---|---|---|
| 1 | 0002 | 0002 | |
| 2 | 0004 | 0003 | |
|  |  |  | |

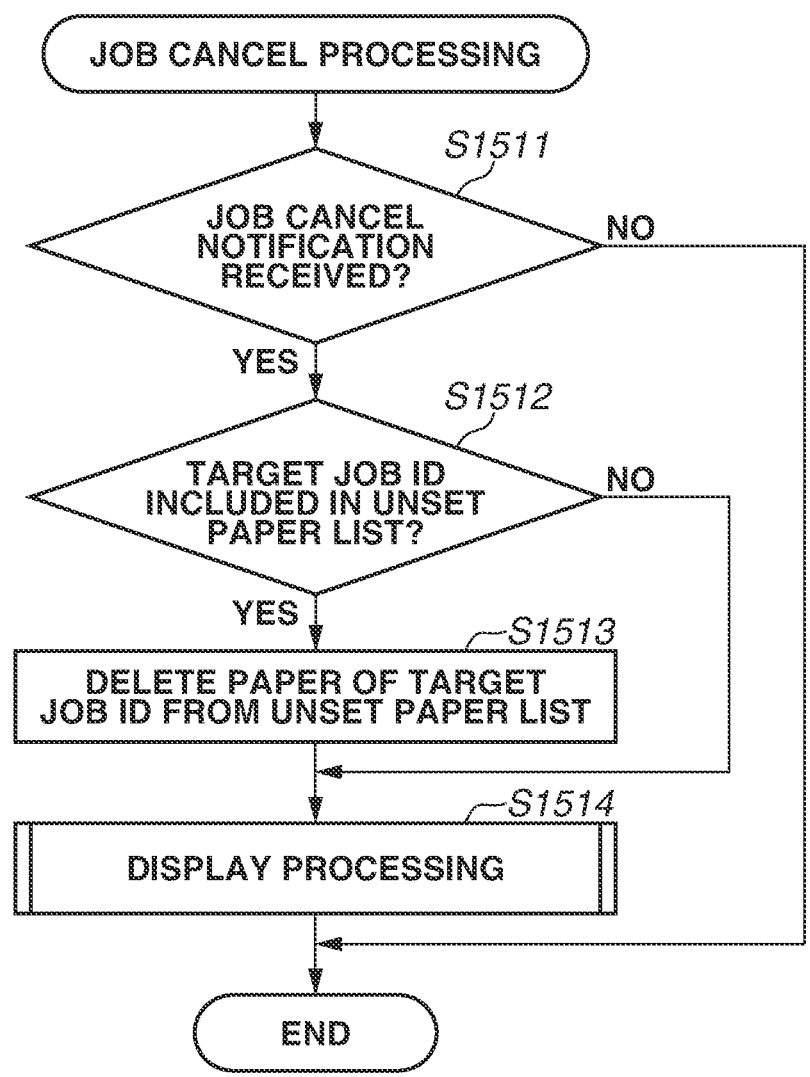

PRINT MANAGEMENT SYSTEM, PRINT MANAGEMENT METHOD, AND STORAGE MEDIUM TO REFINE OPERABILITY FOR PAPER SETTING OPERATIONS

BACKGROUND OF THE INVENTION

Field of the Invention

Aspects of the present disclosure generally relate to a print management system, a print management method, and a storage medium for managing paper information which is used during printing.

Description of the Related Art

To use an image forming apparatus, such as a digital multifunction peripheral, it is necessary to operate an operation unit to set the type and size of paper which is set in a paper feed stage. Operating the operation unit to register paper information, which is information about paper which is actually set in the paper feed stage, with paper feed stage information, which is information about paper feed stages which are managed inside the digital multifunction peripheral, allows appropriately conveying paper to obtain a printed product. Accordingly, the operator, who uses the digital multifunction peripheral, is required to perform a paper setting operation whenever changing paper to be set to a paper feed stage. Therefore, the paper setting operation has become a requisite to obtaining a printed product, and various contrivances to refine the operability for the paper setting operation have been considered.

For example, as a known system such as that discussed in Japanese Patent Application Laid-Open No. 2010-49167, in a case where running out of paper which is caused by paper to be used being unset to a paper feed stage occurs during printing, with a view to informing the operator of the paper with respect to which out of paper occurs, to refine the convenience of the operator, the name of such paper is displayed on the operation unit. According to the paper name displayed on the operation unit, the operator opens a paper setting change screen as a different screen on the operation unit and performs a paper setting operation with respect to an intended paper feed stage. Alternatively, the operator changes paper to be used with use of a job execution change operation screen as a different screen. In that case, a list of jobs is displayed and an object indicating out of paper is displayed on an operation screen available to confirm a print schedule, so that the setting of a job is able to be changed on the operation screen.

In this way, when out of paper occurs, a method capable of changing the setting of a job on an operation screen available to confirm a print schedule is provided, so that an increase in the operability of the digital multifunction peripheral is attempted.

However, in the technique discussed in Japanese Patent Application Laid-Open No. 2010-49167, while the occurrence of running out of paper can be recognized on the operation screen and a job setting change operation can be performed, a paper setting operation for out of paper with respect to a paper feed stage is required to be performed on a different screen. This may impair the operability or convenience of the operator who uses the digital multifunction peripheral, and, as a result, may lead to a situation in which an increase in efficiency of use of the digital multifunction peripheral cannot be attained.

SUMMARY OF THE INVENTION

According to an aspect of the present invention, a print management system including an image forming apparatus and a control apparatus includes a detection unit configured to detect paper information which is set with respect to a print job, a display unit configured to display the paper information detected by the detection unit on a display device, and a setting unit configured to control processing for displaying a setting screen used to allocate the paper information displayed on the display device to a paper feed stage of the image forming apparatus on a screen of the display device.

Further features of the present disclosure will become apparent from the following description of embodiments with reference to the attached drawings.

BRIEF DESCRIPTION OF THE DRAWINGS

FIG. 13 is a diagram illustrating an example of a top screen of the paper management application in the second embodiment.

FIGS. 14A, 14B, 14C, 14D, and 14E are diagrams illustrating examples of an unset paper list.

FIG. 15 is a flowchart illustrating processing which is performed when a job is canceled.

DESCRIPTION OF THE EMBODIMENTS

Figure 1:
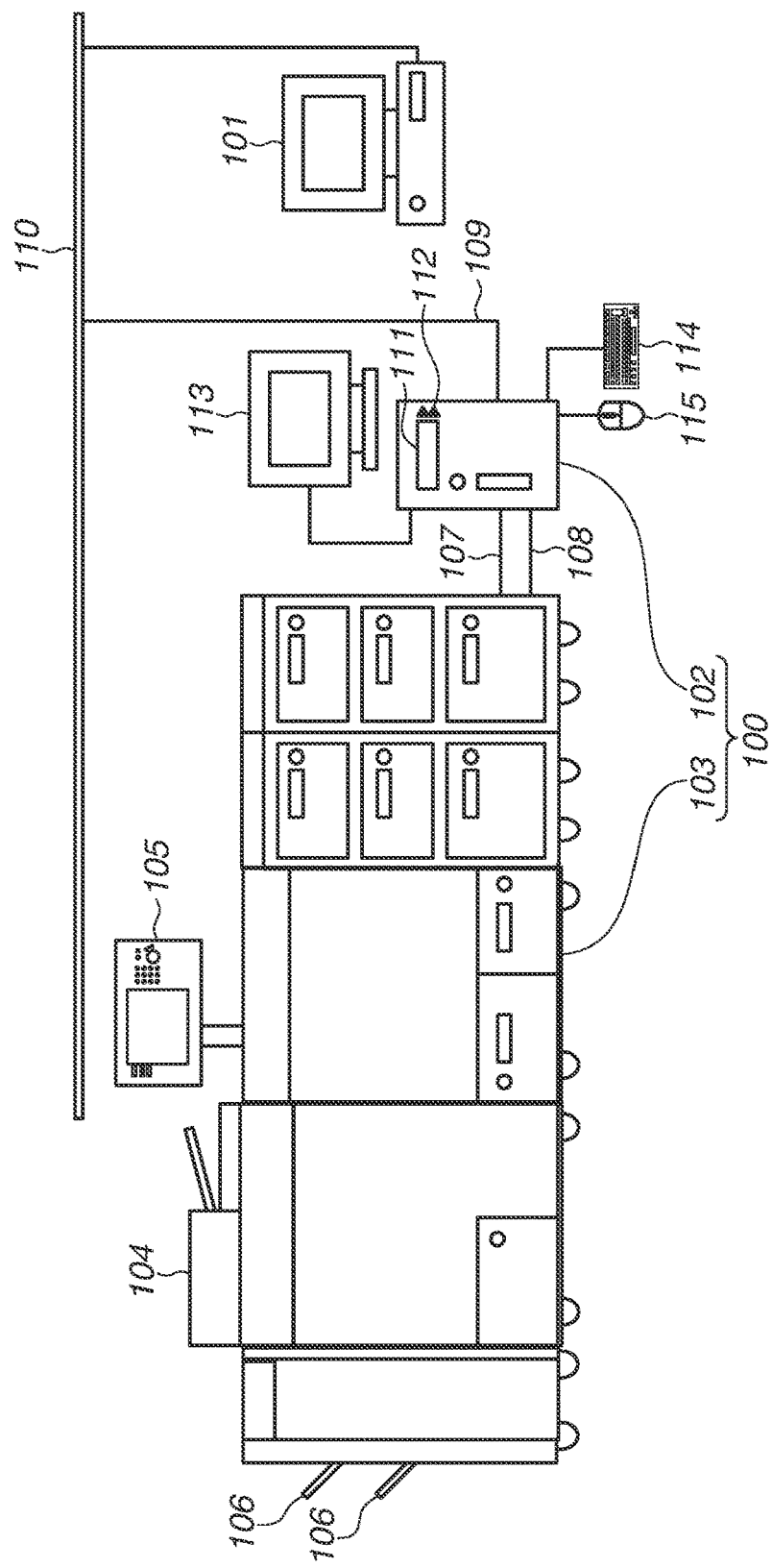
FIG. 1 is a block diagram illustrating an overall configuration example of a print management system according to a first embodiment.

Various embodiments, features, and aspects will be described with reference to the drawings. In the description of the following embodiments and the accompanying drawings, constituent elements having the respective same functions are assigned the respective same reference characters and the description thereof is not repeated.

FIG. 1 is a block diagram illustrating an overall configuration example of a print management system 100 according to a first embodiment.

The print management system 100 illustrated in FIG. 1 includes an image forming apparatus 103 and a print control apparatus 102. The print management system 100 is connected to a client computer 101 in such a way as to be able to communicate therewith. The client computer 101 and the print control apparatus 102 are interconnected via, for example, an Ethernet cable 109 and a local area network (LAN) 110 in such a way as to be able to communicate with each other. Moreover, the print control apparatus 102 and the image forming apparatus 103 are interconnected via, for example, an image video cable 107 and a control cable 108.

In the present embodiment, the image forming apparatus 103 is not directly connected to the LAN 110. The image forming apparatus 103 and the client computer 101 communicate with each other via the print control apparatus 102.

Furthermore, the image forming apparatus 103 can be connected to the LAN 110. In other words, the image forming apparatus 103 can be directly connected to the client computer 101 in such a way as to be able to communicate therewith.

The client computer 101 activates an application to issue, for example, a printing instruction to the print management system 100.

The image forming apparatus 103 is a multifunction peripheral having various functions. More specifically, the image forming apparatus 103 is able not only to perform processing on image data supplied from the client computer 101 or the print control apparatus 102 but also to copy data read by a scanner unit 104 or to send the read data to a shared folder. When the scanner unit 104 is used to scan an image, the image forming apparatus 103 receives various instructions from the operator via various keys on the operation panel of an operation unit 105. Moreover, the operation unit 105 displays various pieces of information, such as a scanning state, on the panel. Paper discharge units 106 each receive a sheet of paper having an image formed thereon and discharges the received sheet.

The print control apparatus 102 performs image processing in cooperation with the image forming apparatus 103. A display unit 111 of the print control apparatus 102 displays information obtained in the print control apparatus 102. An operation button unit 112 of the print control apparatus 102 is allowed to be operated to perform an operation on information displayed on the display unit 111. The information displayed on the display unit 111 is used for the purpose of, for example, displaying information minimally required to operate the print control apparatus 102 (a power-on operation or confirmation of an Internet Protocol (IP) address). An external display device 113 of the print control apparatus 102 is configured with, for example, a liquid crystal monitor. The print control apparatus 102 further includes a keyboard 114 and a pointing device 115 such as a mouse.

In the present embodiment, a case where the print control apparatus 102 and the image forming apparatus 103 are individually provided to configure the print management system 100 is described. On the other hand, a configuration in which the function of the print control apparatus 102 is incorporated into the image forming apparatus 103 and the print control apparatus 102 is not physically provided in a separate manner can be employed. Moreover, the external display device 113 can be configured to have a position input function such as a touchpad to also include the function of the pointing device 115.

Figure 2:
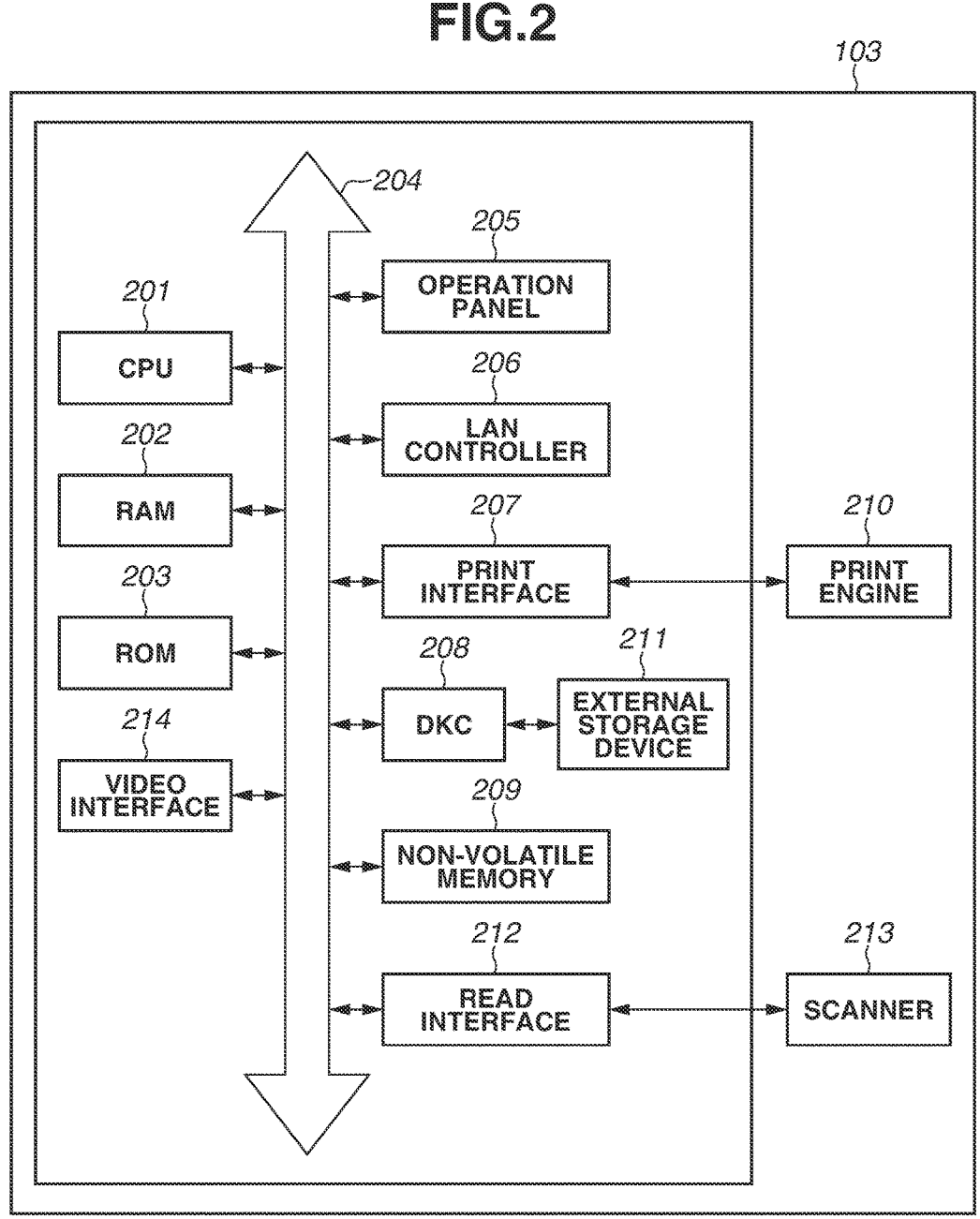
FIG. 2 is a block diagram illustrating a hardware configuration example of an image forming apparatus.

FIG. 2 is a block diagram illustrating a hardware configuration example of the image forming apparatus 103. In FIG. 2, a central processing unit (CPU) 201 comprehensively controls access to various devices connected to a system bus 204 based on a control program stored in a read-only memory (ROM) 203 or an external storage device 211. Moreover, the CPU 201 outputs an image signal as output information to a printing unit (hereinafter referred to as a "print engine") 210, which is connected via a print interface 207, and controls an image signal input from a reading unit (hereinafter referred to as a "scanner") 213, which is connected via a read interface 212. The CPU 201 is able to perform communication processing with the print control apparatus 102 via a LAN controller 206.

A random access memory (RAM) 202 mainly functions as, for example, a main memory or work area for the CPU 201. Access to the external storage device 211, which is configured with, for example, a hard disk drive (HDD) or an integrated circuit (IC) card, is controlled by a disk controller (DKC) 208. The external storage device 211 stores, for example, application programs, font data, and form data, and is used as a job storage region for temporarily spooling a print job (hereinafter referred to as a "job") and externally controlling the spooled job. Moreover, the external storage device 211 is also used as a hold printing data storage region for retaining, as hold printing data, image data read by the scanner 213 or image data about a job and allowing the hold printing data to be referred to from a network or to be printed.

In the present embodiment, an HDD is used as the external storage device 211, which retains various logs, such as job logs and image logs. An operation panel 205 allows the operator to input various pieces of information via software keys or hardware keys. A non-volatile memory 209 stores various pieces of setting information which are set from a terminal via the operation panel 205 or a network. A video interface 214 receives image data from the print control apparatus 102.

Figure 3:
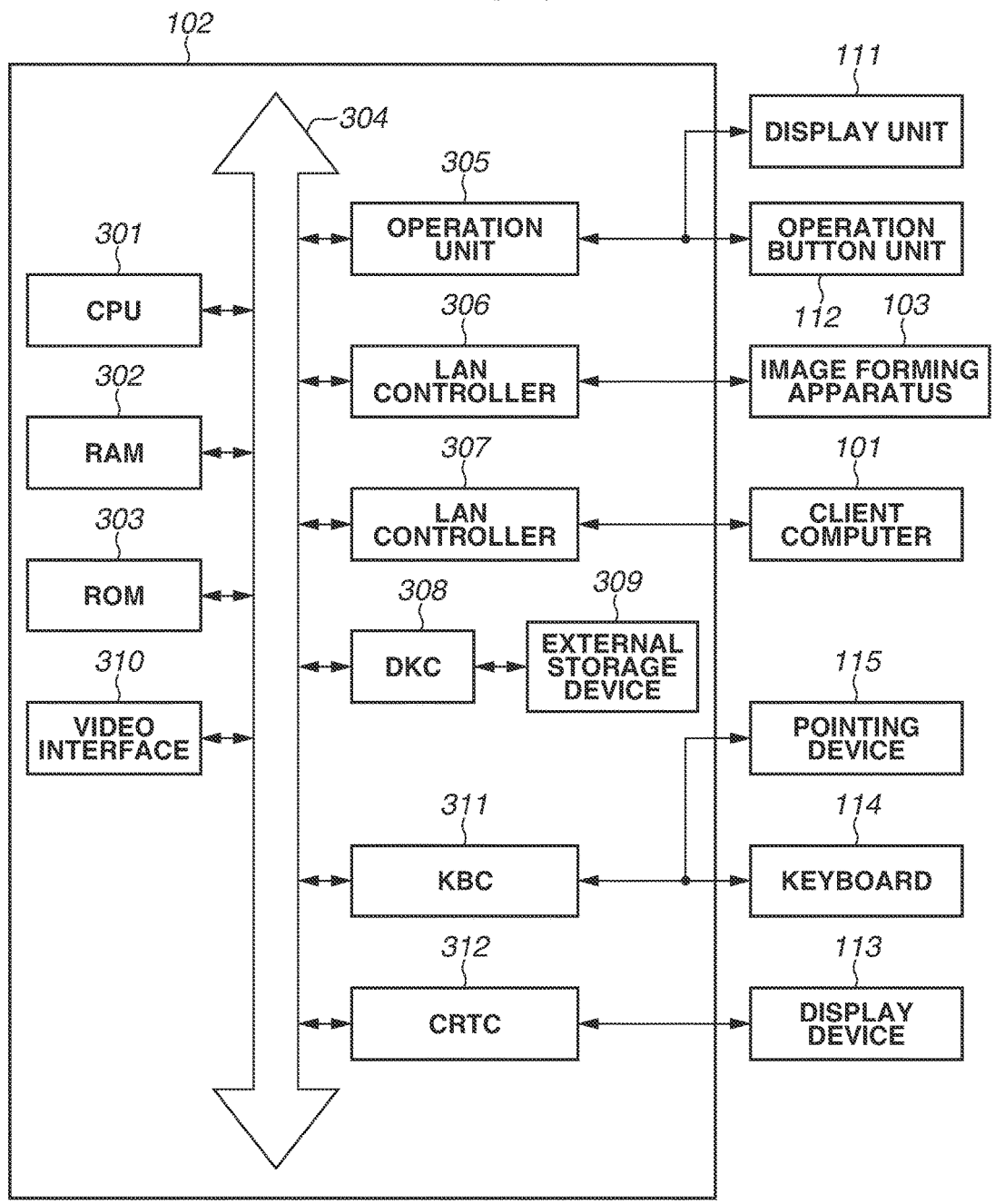
FIG. 3 is a block diagram illustrating a hardware configuration example of a print control apparatus.

FIG. 3 is a block diagram illustrating a hardware configuration example of the print control apparatus 102. In FIG. 3, a CPU 301 comprehensively controls access to various devices connected to a system bus 304 based on a control program stored in a ROM 303 or an external storage device 309. Moreover, the CPU 301 is able to perform communication processing with the image forming apparatus 103 via a LAN controller 306. Furthermore, the CPU 301 is able to perform communication processing with the client computer 101 on a network via a LAN controller 307. A RAM 302 mainly functions as, for example, a main memory or work area for the CPU 301.

Access to the external storage device 309, which is configured with, for example, an HDD or an IC card, is controlled by a disk controller (DKC) 308. The external storage device 309 stores, for example, application programs, font data, and form data, and temporarily spools a job. Moreover, when the spooled job is subjected to raster image processor (RIP) processing, the external storage device 309 is also used as a job storage region for re-storing the processed data. An operation unit 305 allows the operator to input various pieces of information via the operation button unit 112, and is able to display the input information on the display unit 111. A video interface 310 sends the image data subjected to RIP processing to the image forming apparatus 103 via a LAN controller 306. A keyboard controller (KBC) 311 performs processing concerning inputting of, for example, information from, for example, the keyboard 114 or the pointing device 115. A display control unit (hereinafter referred to as a "CRTC") 312 includes a video memory therein, performs drawing of image data on the video memory according to an instruction from the CPU 301, and outputs the image data drawn on the video memory as a video signal to the display device 113.

Figure 4:
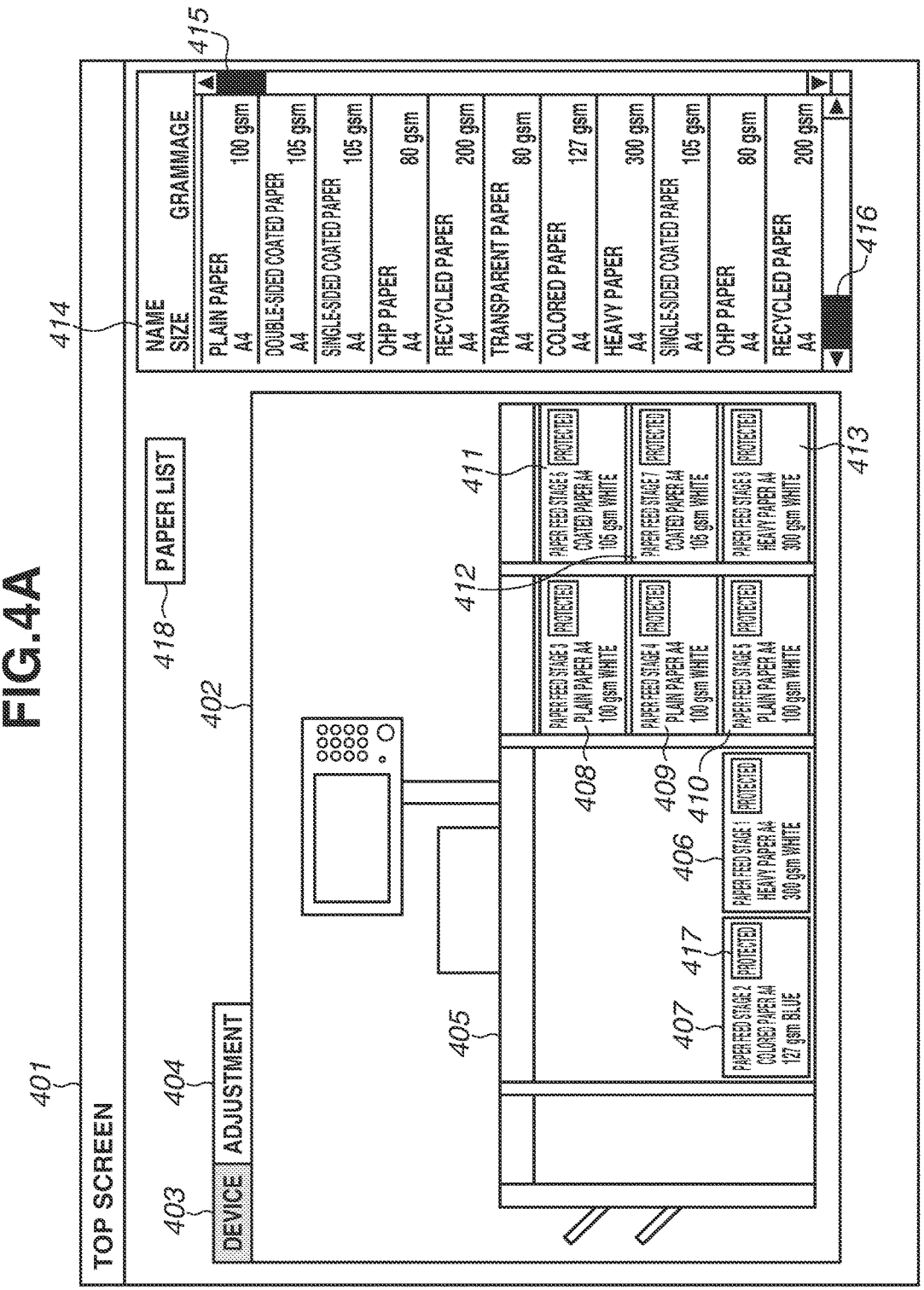
FIGS. 4A and 4B are diagrams illustrating examples of a top screen of a paper management application.

FIGS. 4A and 4B are diagrams illustrating examples of a top screen of a paper management application, which runs on the print control apparatus 102. In FIGS. 4A and 4B, the top screen 401 of the paper management application is in a state of displaying, for example, information about the paper feed stages of the image forming apparatus 103. The top screen 401 is obtained by outputting image data drawn on the video memory of the CRTC 312 as a video signal to the display device 113 according to an instruction from the CPU 301 and displaying the video signal on the display device 113.

A display region 402 in the top screen 401 is a display region which allows tab control to be performed. When the operator touches a device tab 403 via, for example, the pointing device 115, a screen in a state in which paper feed stage information about the image forming apparatus 103 is displayed in the display region 402 can be displayed (a state illustrated in FIG. 4A). On the other hand, when the operator touches an adjustment tab 404, various buttons usable to perform setting of various adjustment values can be displayed in the display region 402 (a state illustrated in FIG. 4B).

In FIG. 4A, an image 405 is a hardware option image representing a connection status of hardware options of the image forming apparatus 103, which is currently connected to the print control apparatus 102. More specifically, when being activated, the paper management application acquires hardware option information about the image forming apparatus 103, and generates and displays an image correctly representing a connection status according to the hardware option information. FIG. 4A in the present embodiment illustrates a state in which two cascade-connected paper feed devices and a paper discharge device are connected to the image forming apparatus 103.

Paper feed stage buttons 406 to 413 are arranged in the image 405. More specifically, the paper management application generates and displays the paper feed stage buttons 406 to 413 based on information about the paper feed stages of the image forming apparatus 103, which the paper management application has acquired when being activated.

In FIGS. 4A and 4B, an image 414 represents paper information, in which attribute information about each type of paper is set to each stage. In the illustrated example, the name, size, and grammage of paper are displayed at each stage as attribute information. When the operator wants to cause attribute information other than the displayed paper attribute information to be displayed, the operator can operate a slider bar 416 to allow such displaying. Moreover, when the operator wants to cause types of paper other than the displayed types of paper to be displayed, the operator can operate a slider bar 415 to allow such displaying.

A button 417 is a button usable to switch whether to allow changing of setting with respect to paper loaded in a paper feed stage. A configuration in which, whenever the operator touches the button 417 via, for example, the pointing device 115, switching whether to allow changing of setting is toggled can be employed. In the present embodiment, the state indicating whether to allow changing of setting is retained for each paper feed stage, and indicates the state in which changing of setting is allowed or the state in which changing of setting is inhibited. Whenever the button 417 is touched by the operator, the paper management application stores the state indicating whether to allow changing of setting in the RAM 302. Furthermore, here, for purposes of description, the state indicating whether to allow changing of setting at the time of activation is assumed to be the state in which changing of setting is allowed.

A button 418 is a button used to issue an instruction to display the paper list image 414. In the present embodiment, when the button 418 is touched by the operator, the paper management application displays the paper list image 414 in the foreground.

In FIG. 4B, a button group 419 is a plurality of adjustment buttons usable to perform various adjustment settings, and adjustment items available in the image forming apparatus 103 are displayed. Operating a slider bar 420 allows confirming adjustment setting items which are not currently displayed.

Figure 5:
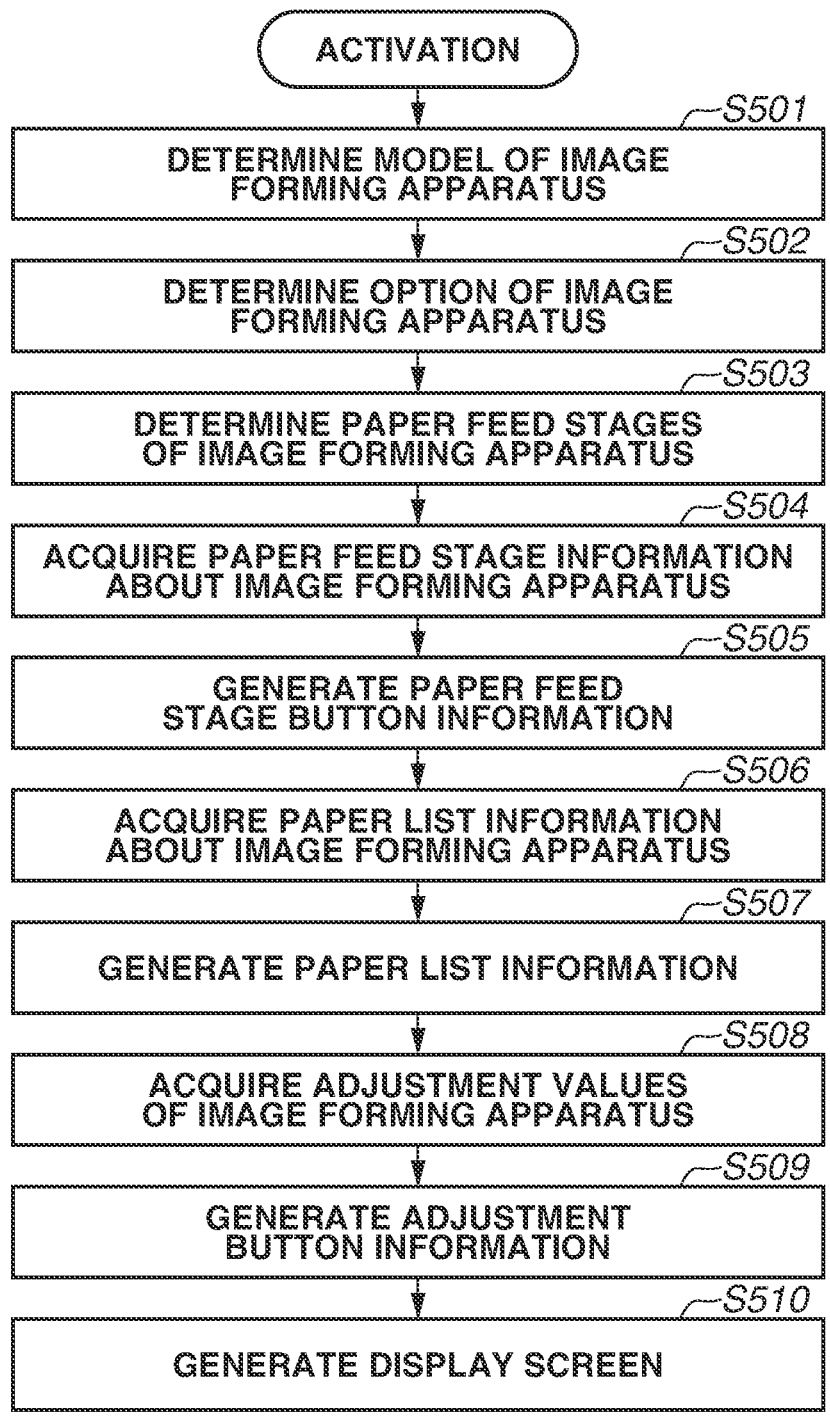
FIG. 5 is a flowchart illustrating processing which is performed during activation of the paper management application.

FIG. 5 is a flowchart illustrating processing for generating the top screen 401 when the paper management application is activated on the print control apparatus 102.

A program which runs on the print control apparatus 102 according to the flowchart of FIG. 5 is stored in, for example, the external storage device 309 illustrated in FIG. 3, and is read out onto the RAM 302 and executed by the CPU 301.

When the paper management application is activated, in step S501, the paper management application determines the model of the image forming apparatus 103 targeted for paper management. The paper management application determines the model of the image forming apparatus 103 and uses information about the determined model of the image forming apparatus 103 when generating the hardware option image 405 or when absorbing a difference in specification of models. Here, the paper management application performs communication with the image forming apparatus 103 to acquire model information, and determines the model of the image forming apparatus 103 based on the model information and model determination information previously retained in the paper management application.

Next, in step S502, the paper management application determines a hardware option connected to the image forming apparatus 103. The paper management application uses information about the determined hardware option when generating the hardware option image 405, when specifying information about a paper feed stage, or when absorbing a difference in specification of models. Here, the paper management application performs communication with the image forming apparatus 103 to acquire hardware option information, and then advances the processing to step S503.

In step S503, the paper management application determines paper feed stages connected to the image forming apparatus 103 targeted for paper management, and identifies the number of connected paper feed stages.

Next, in step S504, the paper management application performs communication with the image forming apparatus 103 to acquire information about paper set to each paper feed stage. After acquiring paper information about each paper feed stage in step S504, the paper management application advances the processing to step S505.

In step S505, the paper management application generates information about the paper feed stage buttons 406 to 413 to be displayed in the top screen 401.

Next, in step S506, the paper management application performs communication with the image forming apparatus 103 to acquire paper list information from, for example, the external storage device (HDD) 211. After acquiring the paper list information in step S506, the paper management application advances the processing to step S507. In step S507, the paper management application generates paper list information to be displayed in the top screen 401.

In step S508, the paper management application performs communication with the image forming apparatus 103 to acquire adjustment values of the respective adjustment items used for settings of the adjustment buttons 419 from, for example, the external storage device (HDD) 211.

Next, in step S509, the paper management application generates character strings to be set to the respective adjustment buttons 419, in other words, adjustment button information, for displaying in the top screen 401 from the acquired adjustment values. In each adjustment item, in a case where there is only one adjustment value, the adjustment value is displayed, and, in a case where there are two or more adjustment values, "adjustment applied" or "adjustment not applied" is displayed.

In step S510, the paper management application generates the top screen 401 based on the model and hardware option information about the image forming apparatus 103 and the paper information acquired in the above-described way and the generated paper feed stage button information, paper list information, and adjustment button information.

Figure 6:
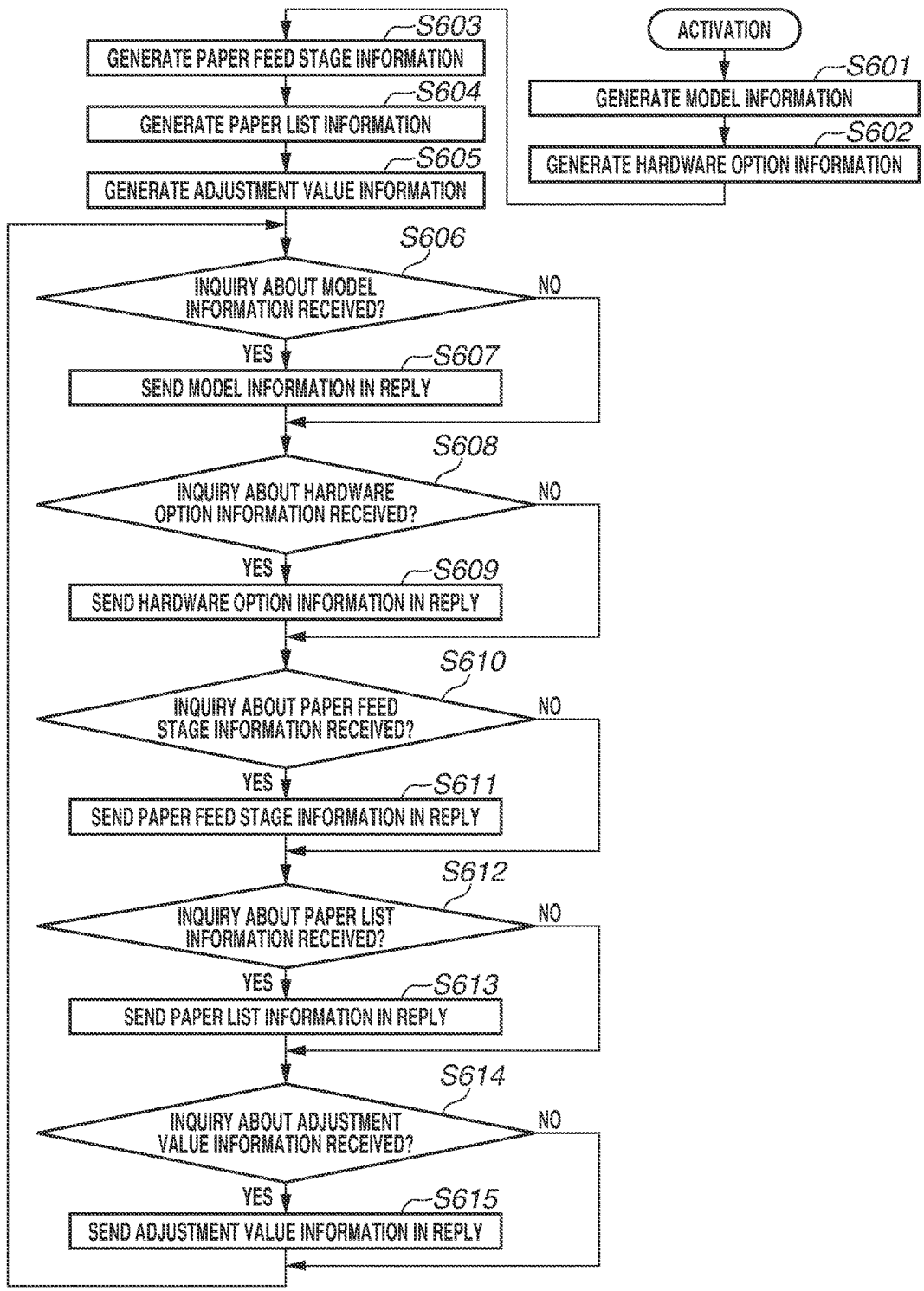
FIG. 6 is a flowchart illustrating processing which is performed during activation of the image forming apparatus.

FIG. 6 is a flowchart illustrating processing which the image forming apparatus 103 performs, for example, to generate various pieces of information required for the paper management application, which runs on the print control apparatus 102, while communicating with the print control apparatus 102.

A program which runs on the image forming apparatus 103 according to the flowchart of FIG. 6 is stored in, for example, the external storage device (HDD) 211 illustrated in FIG. 2, and is read out onto the RAM 202 and executed by the CPU 201.

When activated, the image forming apparatus 103 advances the processing to step S01, in which the image forming apparatus 103 acquires model information about the image forming apparatus 103 from the external storage device (HDD) 211 and generates the model information as data capable of being sent in reply.

Next, in step S602, the image forming apparatus 103 acquires, from the print engine 210 via the print interface 207, hardware option information about options connected to the image forming apparatus 103 and stores, in the RAM 202, the hardware option information as data capable of being sent in reply.

Next, in step S603, the image forming apparatus 103 reads out the acquired hardware option information from the RAM 202 and generates paper feed stage information about the image forming apparatus 103 as data capable of being sent in reply.

In step S604, the image forming apparatus 103 acquires paper list information about the image forming apparatus 103 from the external storage device (HDD) 211 and generates the paper list information as data capable of being sent in reply. After generating data about the paper list information in step S604, the image forming apparatus 103 advances the processing to step S605. In step S605, the image forming apparatus 103 acquires adjustment value information about each type of paper from the external storage device (HDD) 211 and generates the adjustment value information as data capable of being sent in reply. The adjustment value information is generated with respect to every adjustment item available in the image forming apparatus 103.

Next, in step S606, the image forming apparatus 103 determines whether an inquiry about model information has been received from the print control apparatus 102. If it is determined that an inquiry about model information has been received (YES in step S606), the image forming apparatus 103 advances the processing to step S607. In step S607, the image forming apparatus 103 sends the model information generated in step S601 in reply, and then advances the processing to step S608. If, in step S606, it is determined that no inquiry about model information has been received (NO in step S606), the image forming apparatus 103 also advances the processing to step S608.

In step S608, the image forming apparatus 103 determines whether an inquiry about hardware option information has been received from the print control apparatus 102. If it is determined that an inquiry about hardware option information has been received (YES in step S608), the image forming apparatus 103 advances the processing to step S609. In step S609, the image forming apparatus 103 sends the hardware option information generated in step S602 in reply, and then advances the processing to step S610. If, in step S608, it is determined that no inquiry about hardware option information has been received (NO in step S608), the image forming apparatus 103 also advances the processing to step S610.

In step S510, the image forming apparatus 103 determines whether an inquiry about paper feed stage information has been received from the print control apparatus 102. If it is determined that an inquiry about paper feed stage information has been received (YES in step S610), the image forming apparatus 103 advances the processing to step S611. In step S611, the image forming apparatus 103 sends the paper feed stage information generated in step S603 in reply, and then advances the processing to step S612. If, in step S610, it is determined that no inquiry about paper feed stage information has been received (NO in step S610), the image forming apparatus 103 also advances the processing to step S612.

In step S612, the image forming apparatus 103 determines whether an inquiry about paper list information has been received from the print control apparatus 102. If it is determined that an inquiry about paper list information has been received (YES in step S612), the image forming apparatus 103 advances the processing to step S613. In step S613, the image forming apparatus 103 sends the paper list information generated in step S604 in reply, and then advances the processing to step S614. If, in step S612, it is determined that no inquiry about paper list information has been received (NO in step S612), the image forming apparatus 103 also advances the processing to step S614.

In step S614, the image forming apparatus 103 determines whether an inquiry about adjustment value information has been received from the print control apparatus 102. If it is determined that an inquiry about adjustment value information has been received (YES in step S614), the image forming apparatus 103 advances the processing to step S615. In step S615, the image forming apparatus 103 sends the adjustment value information generated in step S605 in reply, and then returns the processing to step S606. If, in step S614, it is determined that no inquiry about adjustment value information has been received (NO in step S614), the image forming apparatus 103 also returns the processing to step S606.

The print control apparatus 102 stores these pieces of information received from the image forming apparatus 103 in, for example, the RAM 302.

Next, a paper setting screen for a paper feed stage in the print control apparatus 102 is described with reference to FIGS. 4A and 4B and FIG. 7.

Figure 7:
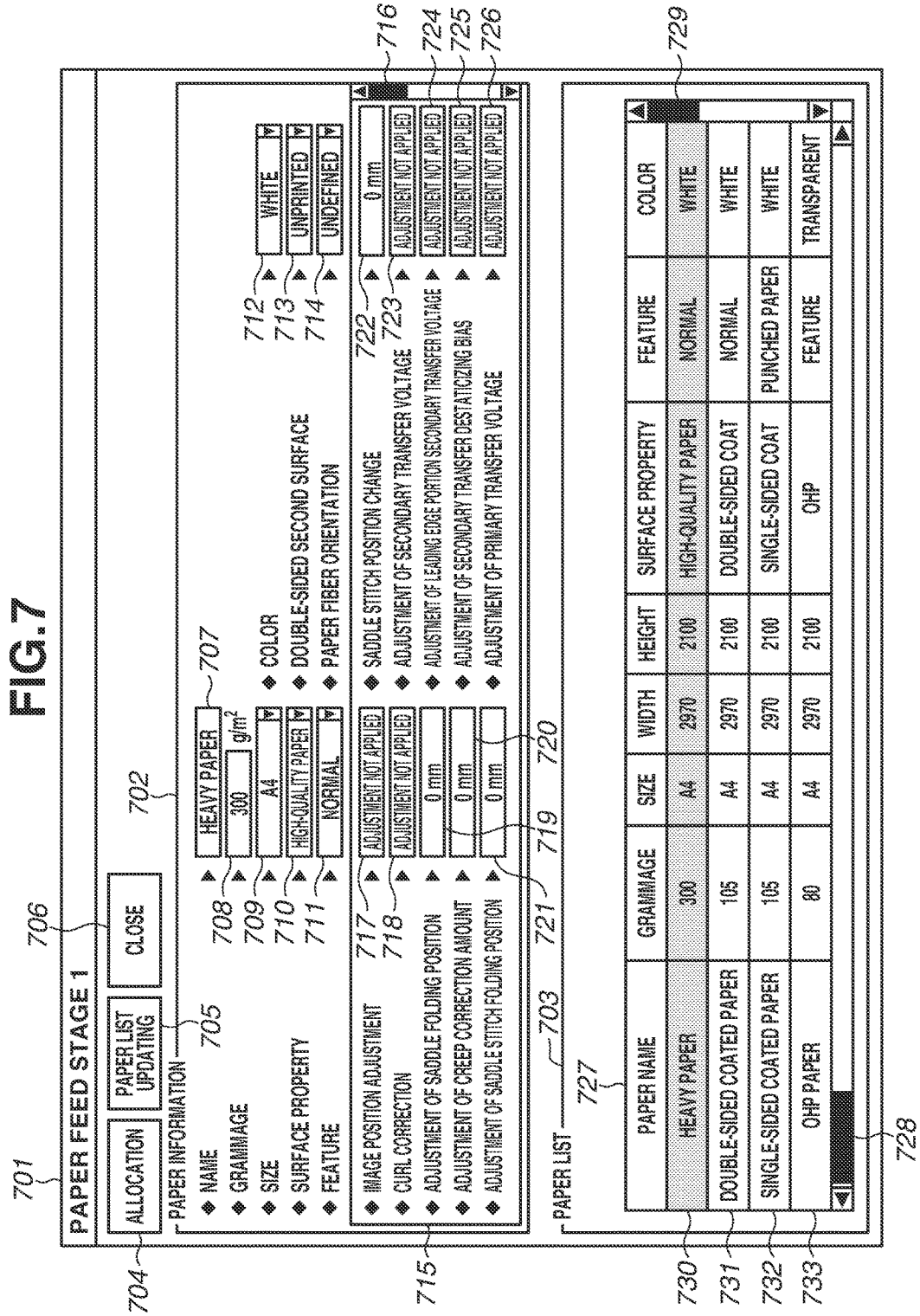
FIG. 7 is a diagram illustrating an example of a paper feed stage setting screen of the paper management application.

In FIG. 4A, when the operator touches, for example, a button 406 for the paper feed stage 1 via, for example, the pointing device 115, a paper setting screen for the paper feed stage 1 is displayed as illustrated in FIG. 7. Paper setting screens corresponding to buttons 407 to 413 for the paper feed stages 2 to 8 are similar to the paper setting screen corresponding to the button 406 for the paper feed stage 1, and are, therefore, omitted from description. In the present embodiment, although not described in detail, naturally, the paper feed stages include all types of paper feed devices, such as an inserter and a manual feed tray. Moreover, while, in the following description, a description regarding using, for example, the pointing device 115 for the operator to operate an application, such as to perform a button touch operation, is omitted, naturally, such an operation is performed with use of such an input device.

As illustrated in FIG. 7, the paper setting screen for the paper feed stage 1 is a screen obtained as a result of image data drawn on the video memory of the CRTC 312 based on an instruction from the CPU 301 being output as a video signal to the external display device 113 and being displayed on the external display device 113. A top screen 701 of the paper setting screen for the paper feed stage 1 includes, as display items, a paper information display region 702, a paper list display region 703, an allocation button 704, a paper list updating button 705, and a close button 706. The paper information display region 702 is used to display setting information about the currently selected paper.

When the top screen 701 is opened by the operator touching the button 406 for the paper feed stage 1 in the top screen 401 illustrated in FIG. 4A, information about paper that is currently allocated to the paper feed stage 1 is displayed. The paper list display region 703 is used to display, in a list form, paper information about types of paper which are managed by the print control apparatus 102 and the image forming apparatus 103. When the operator selects paper from the paper list display region 703, information about the selected paper is displayed in the paper information display region 702.

First, input items of the paper information display region 702 are described. An input item 707 is a text area to which the name of paper is allowed to be input. When changing the name, the operator can input characters to this text area with use of, for example, the keyboard 114. While, in the following description, a description regarding using, for example, the keyboard 114 for inputting is omitted, naturally, inputting of characters is performed with use of such an input device. To reflect the changed information in paper information for the paper feed stage 1, the operator can touch the paper list updating button 705. Touching the paper list updating button 705 allows changing paper information (paper feed stage information) for the paper feed stage 1 in, for example, the RAM 202 of the print control apparatus 102 and, for example, the RAM 302 of the image forming apparatus 103.

An input item 708 is a text area to which a grammage is allowed to be input, and, since its inputting and updating operations are similar to those of the name text area 707, the description thereof is omitted here.

An input item 709 is a combo box for displaying size information about paper, in which an intended size is allowed to be selected and set from size information displayed in a list form. To reflect the changed information in paper information for the paper feed stage 1, the operator can touch the paper list updating button 705. Touching the paper list updating button 705 allows changing paper information for the paper feed stage 1 in the print control apparatus 102 and the image forming apparatus 103.

An input item 710 is a combo box for displaying surface property information. Its information setting and updating operations are similar to those of the size combo box 709, and are, therefore, omitted from description. An input item 711 is a combo box for displaying feature information, and, since its information setting and updating operations are similar to those of the size combo box 709, the description thereof is omitted. An input item 712 is a combo box for displaying color information, and, since its information setting and updating operations are similar to those of the size combo box 709, the description thereof is omitted. An input item 713 is a combo box for displaying double-sided second surface information, and, since its information setting and updating operations are similar to those of the size combo box 709, the description thereof is omitted. An input item 714 is a combo box for displaying paper fiber orientation information, and, since its information setting and updating operations are similar to those of the size combo box 709, the description thereof is omitted.

A region 715 is used to collectively display settings related to adjustment. Since there are a large number of setting items related to adjustment, not all of the setting items are able to be set in this screen. To allow confirming a setting item related to adjustment which is not currently displayed, the operator can operate a slider bar 716 to display a setting item thereof.

In the region 715, a button 717 is a setting item button for image position adjustment, which displays whether the current paper has already been subjected to adjustment. In a case where the current paper has already been subjected to adjustment, the setting item button 717 displays "adjustment applied", and in a case where the current paper has not yet been adjusted, the setting item button 717 displays "adjustment not applied". A button 718 is a setting item button for curl correction. A button 719 is a setting item button for saddle folding position, which displays the current adjustment value in millimeters (mm). A button 720 is a setting item button for adjustment of creep correction amount. A button 721 is a setting item button for adjustment of saddle stitch folding position. A button 722 is a setting item button for saddle stitch position change. A button 723 is a setting item button for adjustment of secondary transfer voltage. A button 724 is a setting item button for adjustment of leading edge portion secondary transfer voltage. A button 725 is a setting item button for adjustment of secondary transfer destaticizing bias. A button 726 is a setting item button for adjustment of primary transfer voltage.

A configuration in which, when each of the setting item buttons 717 to 726 for adjustment is touched, the corresponding adjustment screen is displayed to allow information inputting to be employed. To reflect the changed information in paper information for the paper feed stage 1, the operator can touch the paper list updating button 705. Touching the paper list updating button 705 allows changing paper information for the paper feed stage 1 in the print control apparatus 102 and the image forming apparatus 103.

Next, the paper list display region 703 is described. A table 727 is used to display a paper list, in which attribute information about paper is set at the columns and the paper name is set at the rows. When wanting to display attribute information other than the currently displayed attribute information about paper, the operator can operate a slider bar 728 to display such attribute information. Moreover, when wanting to display paper other than the currently displayed types of paper, the operator can operate a slider bar 729 to display such paper.

A row 730 indicates paper which is currently displayed in the paper information display region 702, and is highlighted in such a way as to indicate that the paper is currently selected. Rows 731 to 733 indicate types of paper which are not currently displayed in the paper information display region 702. When the operator selects any one of the rows 731 to 733 for types of paper which are not currently selected from the paper list table 727, information about the paper corresponding to the selected row is displayed in the paper information display region 702. In this state, touching the allocation button 704 allows the new selected paper to be allocated to the paper feed stage 1. To exit without making changes, the operator can touch the close button 706. With regard to the other paper feed stages 2 to 8, paper information can also be similarly set.

Figure 8A:
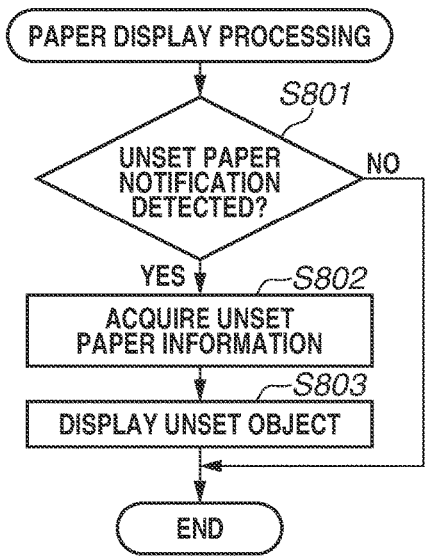
FIGS. 8A, 8B, and 8C are flowcharts illustrating paper setting processing in the first embodiment.

In the first embodiment, paper setting processing performed by the print control apparatus 102 and the image forming apparatus 103 when out of paper caused by paper being unset occurs is described with reference to the flowcharts of FIGS. 8A, 8B, and 8C. In the following description, out of paper caused by paper being unset refers to a state in which, due to the reason that paper to be used for a job is not yet set to any paper feed stage, it is determined that the paper is not present in any paper feed stage in the print management system.

Here, a control program which runs on the print control apparatus 102 according to the present flowcharts is stored in, for example, the ROM 303 or the external storage device 309 illustrated in FIG. 3, and is read out onto the RAM 302 and executed by the CPU 301. Similarly, a control program which runs on the image forming apparatus 103 according to the present flowcharts is stored in, for example, the ROM 203 or the external storage device (HDD) 211 illustrated in FIG. 2, and is read out onto the RAM 202 and executed by the CPU 201.

Figure 9:
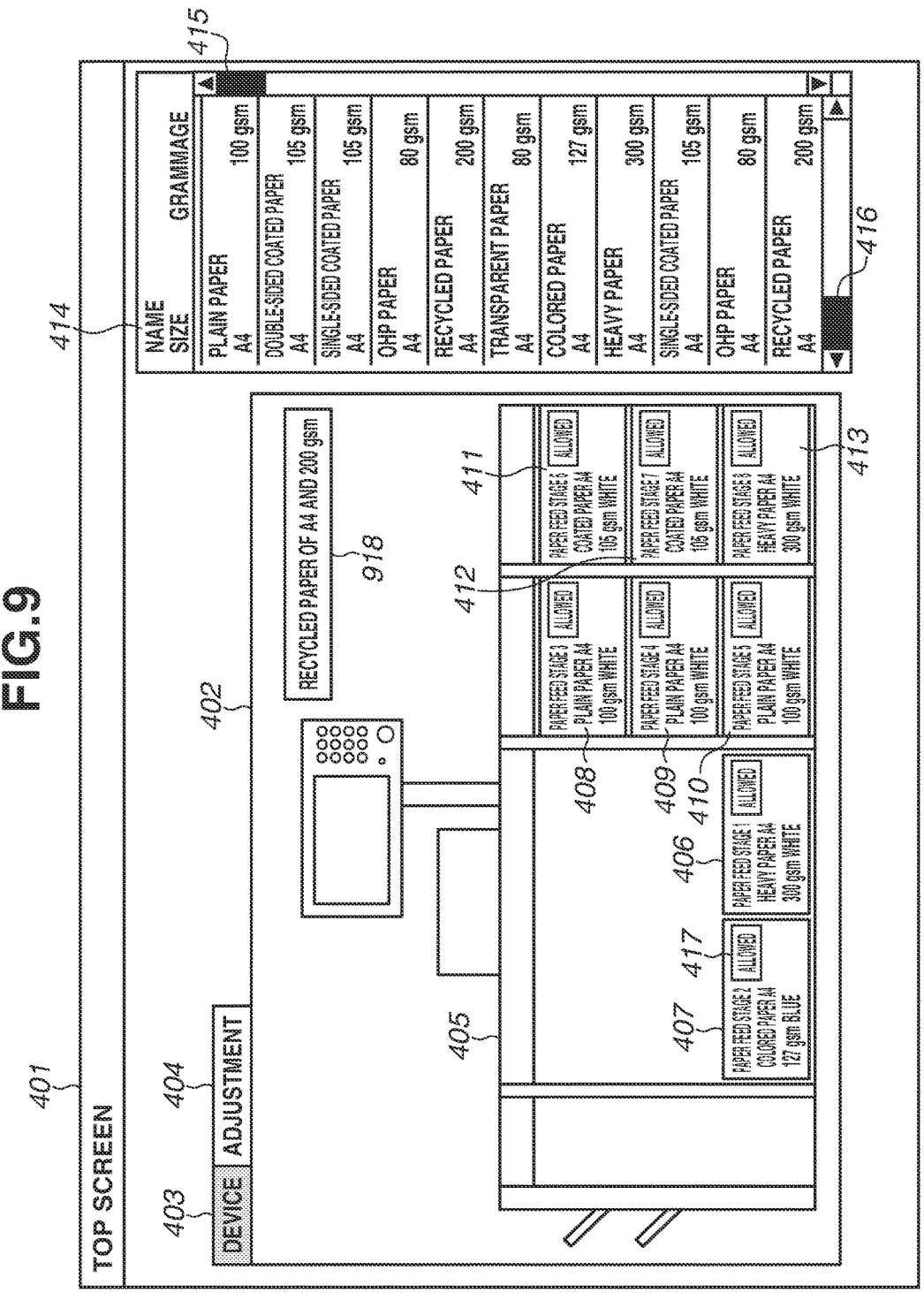
FIG. 9 is a diagram illustrating an example of a top screen of the paper management application in the first embodiment.

In the present embodiment, an example is described in which, when out of paper occurs due to paper being unset during execution of printing, in the print control apparatus 102, an unset object 918 is displayed on the top screen illustrated in FIG. 9 and paper setting is performed with respect to the corresponding paper feed stage.

A prerequisite for describing the present embodiment is described. Here, for purposes of description, it is assumed that, for example, recycled paper of A4 and 200 gsm (g/m²) is set as paper to be used for a job and recycled paper of A4 and 200 gsm is not set to any paper feed stage. In other words, in the top screen illustrated in FIG. 9, all of the paper feed stages are in a condition in which types of paper other than recycled paper of A4 and 200 gsm are set. Moreover, it is assumed that the designation of a paper feed stage is not performed with respect to the job. Furthermore, the present embodiment is described based on an example in which, after out of paper occurs, the operator performs paper setting by dragging and dropping the displayed "recycled paper of A4 and 200 gsm" onto the paper feed stage 1 on the top screen.

Figure 8C:
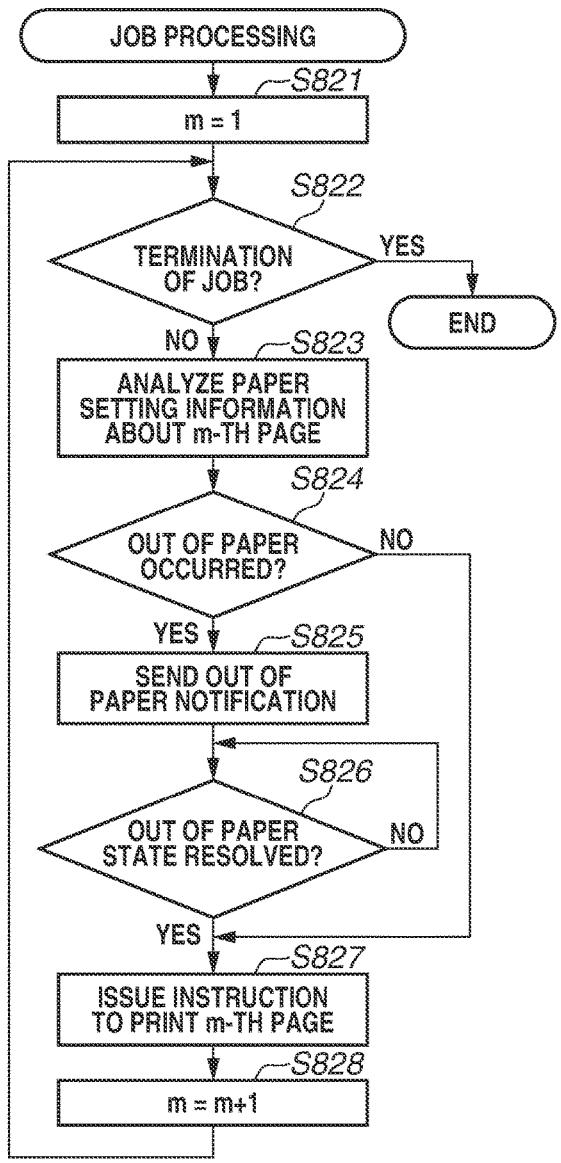
Figure 8B:
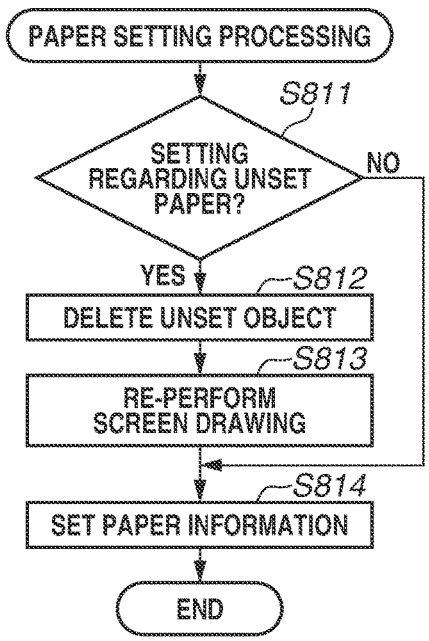

When receiving a job, the image forming apparatus 103 starts job processing illustrated in the flowchart of FIG. 8C. Hereinafter, control of the image forming apparatus 103 is described with reference to the flowchart of FIG. 8C.

In step S821, the CPU 201 initializes a variable m for counting the page number to analyze a setting condition for the job, in other words, setting information for each page of the job. Here, the CPU 201 sets the variable m to 1.

In step S822, the CPU 201 determines whether all of the pieces of setting information about the job have been supplied and the termination of the job has been reached. For example, in a case where, after setting information for all of the pages of the job has been supplied, a notice of termination of setting information of the job is received, the CPU 201 determines whether the termination of the job has been reached according to the presence or absence of reception of the notice of termination. If it is determined that the termination of the job has not been reached (NO in step S822), the CPU 201 advances the processing to step S823. If it is determined that the termination of the job has been reached (YES in step S822), the CPU 201 ends the job processing.

In step S823, the CPU 201 analyzes setting information about a target page of the job received from the client computer 101. Here, the CPU 201 analyzes setting information about the first page of the job and obtains a result of analysis indicating that recycled paper of A4 and 200 gsm (the paper identifier (ID) thereof being 0004) is set as paper to be used.

In step S824, the CPU 201 determines whether the paper to be used is set to any paper feed stage of the image forming apparatus 103 with the set paper ID used as a key from the result of analysis. This determination is performed by, for example, referring to paper feed stage information stored in the RAM 202. If it is determined that the paper to be used is not set to any paper feed stage of the image forming apparatus 103 (YES in step S824), the CPU 201 advances the processing to step S825. If it is determined that the paper to be used is set to any paper feed stage of the image forming apparatus 103 (NO in step S824), the CPU 201 advances the processing to step S827. Here, it is assumed that the paper corresponding to the paper ID (0004) is not set to any paper feed stage, so that the CPU 201 advances the processing to step S825.

In step S825, the CPU 201 sends an out of paper notification to the print control apparatus 102 with respect to the paper ID about which the occurrence of out of paper has been determined in step S824. The out of paper notification is assumed to include, at least, a paper ID used to identify paper and a cause of out of paper. The cause of out of paper includes, for example, paper being unset and the remaining amount of paper of a paper feed stage being zero.

In step S826, the CPU 201 waits until the state of out of paper detected in step S824 is resolved. If it is determined that the state of out of paper detected in step S824 has been resolved (YES in step S826), the CPU 201 advances the processing to step S827.

In step S827, the CPU 201 issues a printing instruction to print the page which is being analyzed.

In step S828, the CPU 201 increments the variable m for the page number targeted for analysis (m=m+1), and the CPU 201 then returns the processing to step S822. In this way, the CPU 201 repeats processing in steps S822 to S828 until the termination of the job is reached.

Next, paper display processing performed by the paper management application, which runs on the print control apparatus 102, is described with reference to the flowchart of FIG. 8A.

Under the condition of the above-described prerequisite, in a condition in which the image forming apparatus 103 has advanced the processing to step S825 illustrated in FIG. 8C, the paper management application of the print control apparatus 102 starts paper display processing when receiving the out of paper notification.

First, in step S801, the CPU 301 analyzes the cause of the out of paper notification received from the image forming apparatus 103 and determines whether the cause of the out of paper notification is paper being unset. If it is determined that the cause of the out of paper notification is paper being unset (YES in step S801), the CPU 301 advances the processing to step S802, and, if it is determined that the cause of the out of paper notification is not paper being unset (NO in step S801), the CPU 301 ends the paper display processing.

In step S802, the CPU 301 acquires a paper ID of the unset paper from the out of paper notification. Here, it is assumed that the paper ID (0004) of recycled paper of A4 and 200 gsm has been acquired.

In step S803, the CPU 301 obtains, for example, the paper name, size, and grammage of the corresponding paper from the paper list information stored in the RAM 302 with the acquired paper ID used as a key, and thus generates an unset object 918 to be displayed on the top screen. The unset object 918 is assumed to include, at least, a paper ID. The CPU 301 controls the external display device 113 to display the unset object 918 in the display region 402 as illustrated in FIG. 9.

The above is the description about the processing performed from the time of the occurrence of out of paper to the time when the paper management application displays the unset object 918 on the external display device 113.

Next, paper setting processing performed by the paper management application, which runs on the print control apparatus 102, is described with reference to the flowchart of FIG. 8B. Here, an example is described in which, in FIG. 9, the operator performs paper setting by dragging and dropping the unset object 918 onto a paper feed stage, for example, the button of the paper feed stage 1, via the pointing device 115 in the display region 402 on the external display device 113.

When the unset object 918 is dragged and dropped onto the button 406 of the paper feed stage 1, in step S811, the CPU 301 determines whether the paper setting processing performed by drag and drop is processing regarding unset paper. For example, types of paper are previously internally defined in a discriminable manner with use of paper information objects, which configure a paper list, and unset objects. The CPU 301 is able to discriminate whether the paper setting processing is processing regarding unset paper by determining whether the object type dropped at the time of paper setting processing is coincident with an unset object.

If, in step S811, it is determined that the paper setting processing is processing regarding unset paper (YES in step S811), the CPU 301 advances the processing to step S812.

On the other hand, if it is determined that the paper setting processing is other than processing regarding unset paper (for example, paper setting processing performed via the paper setting screen illustrated in FIG. 7) (NO in step S811), the CPU 301 advances the processing to paper setting processing in step S814. Furthermore, the paper setting processing in this case is described below as "paper setting processing not caused by out of paper".

In step S812, the CPU 301 deletes the unset object 918 which is being displayed on the external display device 113.

In step S813, the CPU 301 performs control to re-draw and display a screen in which the unset object has been deleted on the external display device 113.

In step S814, the CPU 301 acquires paper information from the paper list stored in, for example, the RAM 302 with a paper ID included in the unset object used as a key, and sets the acquired paper information to the paper feed stage onto which drop has been performed. Here, paper information about recycled paper of A4 and 200 gsm with a paper ID of 0004 is set to the paper feed stage 1.

The CPU 301 updates display information about the paper feed stage button in the paper list information. Here, display information about the paper feed stage button 406 is updated with paper information about recycled paper of A4 and 200 gsm with a paper ID of 0004. More specifically, in the example illustrated in FIG. 9, paper information for the paper feed stage 1 is previously set as heavy paper of A4 and 300 gsm, and, according to the above paper setting processing, the paper information for the paper feed stage 1 is changed to recycled paper of A4 and 200 gsm. In other words, paper information (paper feed stage information) for the paper feed stage 1 stored in the RAM 302 is changed to recycled paper of A4 and 200 gsm, and displaying of the paper feed stage button 406 in the image 405 illustrated in FIG. 9 is similarly changed. Moreover, the changed paper information for the paper feed stage 1 is communicated to the image forming apparatus 103 and is then reflected in the paper information (paper feed stage information) for the paper feed stage 1 stored in the RAM 202.

The above is the description about the processing performed from the time when the unset object is displayed in response to reception of the unset paper notification to the time when the unset object 918 illustrated in FIG. 9 disappears by the paper setting operation. With this, when out of paper caused by paper being unset occurs, the operator is allowed to perform paper setting on the paper feed stage 1 by dragging and dropping the unset object 918.

In the present embodiment, when out of paper caused by paper being unset occurs, the operator can perform a paper setting operation in the top screen 401 of the paper management application illustrated in FIGS. 4A and 4B. In other words, the operator is not required to perform such a troublesome operation as to perform paper setting by touching a paper feed stage button corresponding to a paper feed stage targeted for paper setting in the top screen 401 illustrated in FIGS. 4A and 4B to open the top screen 701 of the paper setting screen illustrated in FIG. 7. Accordingly, in the present embodiment, the operability and convenience of a paper setting operation by the operator when out of paper caused by paper being unset occurs are refined.

Furthermore, while, in the present embodiment, a configuration in which only paper setting is performed has been described, a configuration in which, after paper setting, the image forming apparatus does not feed the set paper until paper in the corresponding paper feed stage is replaced or supplied can be employed.

Next, a second embodiment, which is related to paper setting performed when out of paper caused by paper being unset occurs with respect to a plurality of types of paper, is described with reference to FIGS. 10A and 10B to FIGS. 14A, 14B, 14C, 14D, and 14E.

In the present embodiment, with regard to a new job, when out of paper caused by paper being unset occurs with respect to a plurality of types of unset paper, corresponding unset objects are displayed in the order of occurrence of out of paper, so that the operator can perform paper setting via, for example, a pointing device.

Hardware configurations of a print control apparatus 102 and an image forming apparatus 103 in the present embodiment are similar to those in the first embodiment.

Figure 10A:
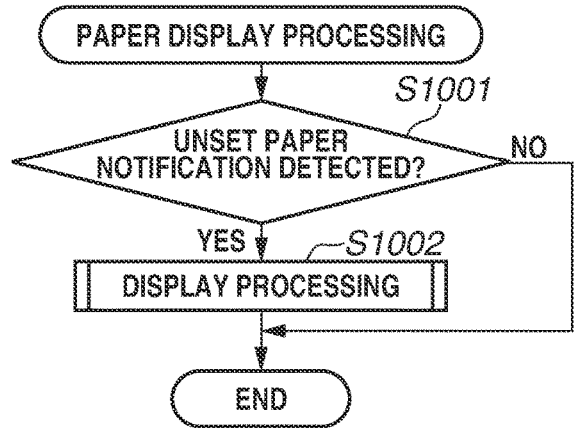
FIGS. 10A and 10B are flowcharts illustrating paper display processing in a second embodiment.
Figure 10B:
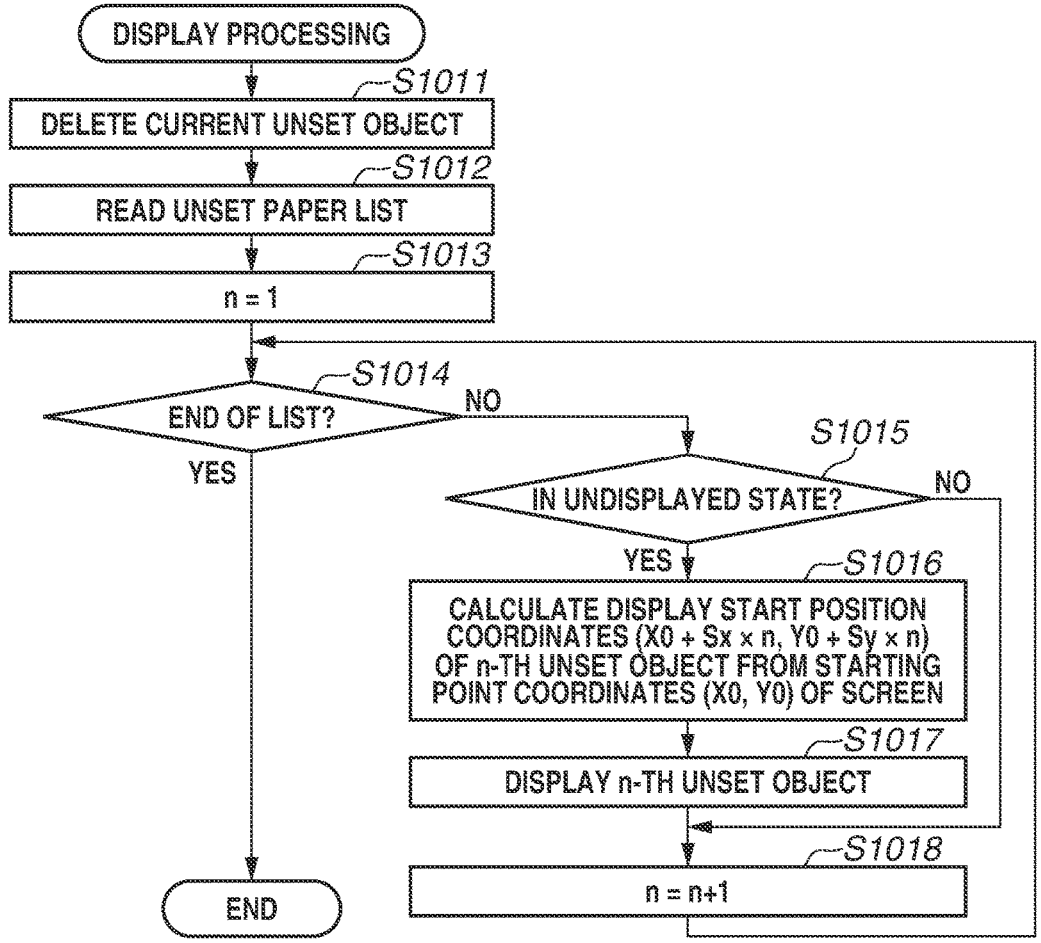
Figure 11:
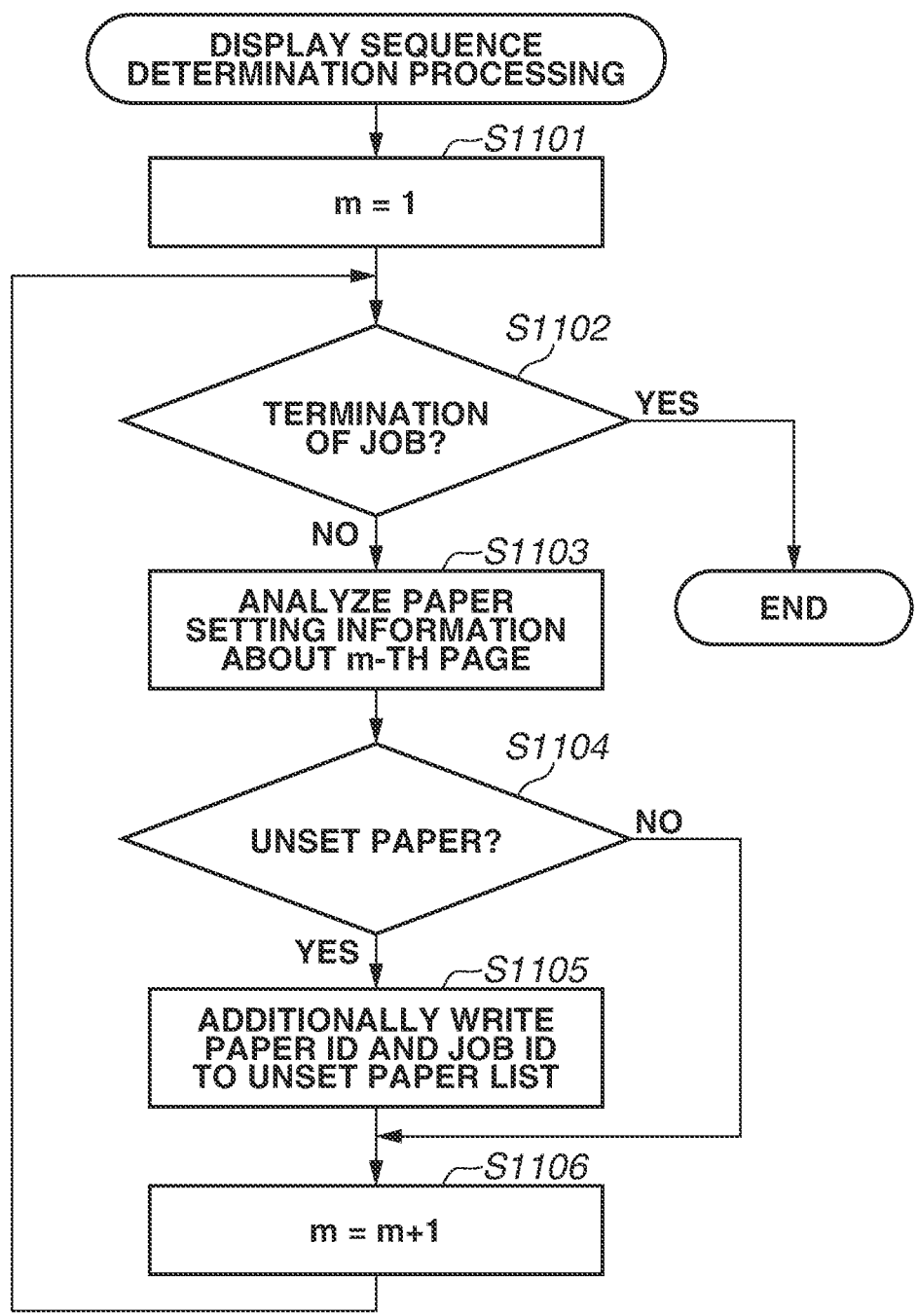
FIG. 11 is a flowchart illustrating display sequence determination processing in the second embodiment.
Figure 12:
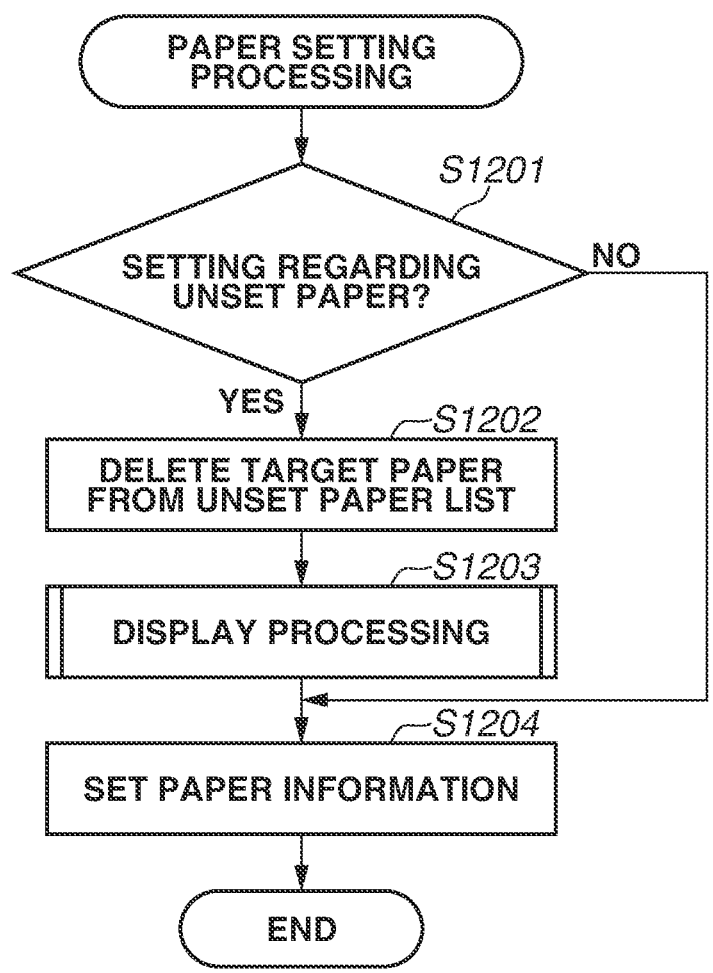
FIG. 12 is a flowchart illustrating paper setting processing in the second embodiment.

A program which runs on the print control apparatus 102 according to the flowcharts of FIGS. 10A and 10B and FIG. 12 is stored in, for example, the external storage device 309 illustrated in FIG. 3, and is read out onto the RAM 302 and executed by the CPU 301. Moreover, a program which runs on the image forming apparatus 103 according to the flowchart of FIG. 11 is stored in, for example, the ROM 203 illustrated in FIG. 2, and is read out onto the RAM 202 and executed by the CPU 201.

In the present embodiment, an example is described in which, when out of paper caused by paper being unset occurs with respect to a plurality of types (here, two types) of paper in the process of the CPU 201 of the image forming apparatus 103 analyzing setting information about a job, an unset paper notification is issued.

A prerequisite for describing the present embodiment is described. Here, for purposes of description, a condition in which an instruction for printing of one job is issued to the image forming apparatus 103 is assumed. In that job (for example, the job ID thereof being 0001), for example, recycled paper of A4 and 200 gsm (for example, the paper ID thereof being 0004) is assumed to be set as paper to be used for the first page. Moreover, for example, single-sided coated paper of A4 and 105 gsm (for example, the paper ID thereof being 0002) is assumed to be used for the other pages. Furthermore, it is assumed that neither recycled paper of A4 and 200 gsm nor single-sided coated paper of A4 and 105 gsm is set to any paper feed stage of the image forming apparatus 103. Moreover, double-sided coated paper is assumed to be set to the paper feed stages 6 and 7. Additionally, it is assumed that the designation of a paper feed stage is not performed with respect to the job.

In the following description, display sequence determination processing performed by the image forming apparatus 103 is described with reference to the flowchart of FIG. 11. Upon receiving a job, the image forming apparatus 103 starts the display sequence determination processing.

In step S1101, the CPU 201 initializes a variable m for counting the page number to analyze setting information for each page of the job. Here, the CPU 201 sets the variable m to 1.

In step S1102, the CPU 201 determines whether all of the pieces of setting information about the job have been supplied and the termination of the job has been reached. For example, in a case where, after setting information for all of the pages of the job has been supplied, a notice of termination of setting information of the job is received, the CPU 201 determines whether the termination of the job has been reached according to the presence or absence of reception of the notice of termination. If it is determined that the termination of the job has not been reached (NO in step S1102), the CPU 201 advances the processing to step S1103. If it is determined that the termination of the job has been reached (YES in step S1102), the CPU 201 ends the display sequence determination processing.

In step S1103, the CPU 201 analyzes a setting condition of the job, in other words, setting information about a target page of the job. Here, the CPU 201 analyzes setting information about the first page of the first job (the job ID thereof being 0001) and obtains a result of analysis indicating that recycled paper of A4 and 200 gsm (the paper ID thereof being 0004) is set as paper to be used.

In step S1104, the CPU 201 determines whether the paper to be used is set to any paper feed stage of the image forming apparatus 103 with the set paper ID used as a key from the result of analysis. This determination is performed by, for example, referring to information stored in the RAM 202. If it is determined that the paper to be used is not set to any paper feed stage of the image forming apparatus 103 (YES in step S1104), the CPU 201 advances the processing to step S1105. If it is determined that the paper to be used is set to any paper feed stage of the image forming apparatus 103 (NO in step S1104), the CPU 201 advances the processing to step S1106. Here, it is assumed that the paper corresponding to the paper ID (0004) is not set to any paper feed stage, so that the CPU 201 advances the processing to step S1105.

In step S1105, the CPU 201 stores the paper ID, which has been acquired in step S1103, and the job ID, which is currently analyzed, in an unset paper list 1400 such as that illustrated in FIG. 14A. For example, this is performed in the form of additionally writing the paper ID and the job ID to the unset paper list according to the occurrence order of unset paper. Accordingly, here, the CPU 201 writes the paper ID (0004) and the job ID (0001) to the occurrence order 1 in the unset paper list. Furthermore, the unset paper list is stored in, for example, the RAM 202.

In step S1106, the CPU 201 increments the variable m for the page number targeted for analysis (m=m+1), and the CPU 201 then returns the processing to step S1102, thus repeating processing in steps S1102 to S1106. Here, the CPU 201 performs processing in steps S1102 to S1106 with respect to the second page.

In step S1105 for the second page, the CPU 201 additionally writes the paper ID (0002) and the job ID (0001) to the occurrence order 2 in the unset paper list. Then, similarly, the CPU 201 increments the variable m for the page number targeted for analysis, thus repeating processing in steps S1102 to S1106.

In this way, when detection of unset paper is completed with respect to all of the pages targeted for analysis of the job (YES in step S1102), the image forming apparatus 103 completes the unset paper list 1400 illustrated in FIG. 14A, and then communicates the unset paper list 1400 as an unset paper notification to the print control apparatus 102.

A case where the display sequence determination processing is performed with respect to a plurality of jobs is described. For example, in a case where the unset paper in the second job is only, for example, recycled paper of A4 and 200 gsm, the paper ID (0004) and the job ID (0002) are additionally written to the occurrence order 3, as indicated by an unset paper list 1420 illustrated in FIG. 14C. Subsequently, even in the case of the display sequence determination processing with respect to three or more jobs, a paper ID and a job ID are additionally written for each occurrence order in a similar way, so that the unset paper list is generated.

Furthermore, in a case where the ID of unset paper detected in a job which is currently analyzed is the same as the paper ID detected in another job analyzed prior to that job, a configuration in which the detected ID of unset paper is not additionally written to the unset paper list can be employed to avoid duplicated writing of the same paper ID.

Next, paper display processing which is performed by the paper management application in the print control apparatus 102 in response to the unset paper notification received from the image forming apparatus 103 is described with reference to the flowchart of FIG. 10A.

Next, in step S1001, the CPU 301 determines whether the unset paper notification has been received from the image forming apparatus 103. If it is determined that the unset paper notification has been received from the image forming apparatus 103 (YES in step S1001), the CPU 301 advances the processing to display processing in step S1002. If it is determined that no notification has been received or the received notification is not the unset paper notification (NO in step S1001), the CPU 301 ends the paper display processing.

Next, display processing which is performed by the paper management application in the print control apparatus 102 is described with reference to the flowchart of FIG. 10B and, for example, FIG. 13.

First, in step S1011, the CPU 301 deletes an unset object currently displayed from a display region 402 (see FIG. 13) of the top screen 401 displayed on the external display device 113. If there is no unset object currently displayed, the CPU 301 skips this deletion processing.

In step S1012, the CPU 301 reads an unset paper list 1400 included in the received unset paper notification.

In step S1013, the CPU 301 initializes a variable n indicating a display order. Here, the CPU 301 sets the variable n to 1.

In step S1014, the CPU 301 determines whether the end of the unset paper list 1400 has been reached. If it is determined that the end of the unset paper list 1400 has been reached (YES in step S1014), the CPU 301 ends the display processing and then proceeds to the paper display processing.

If it is determined that the end of the unset paper list 1400 has not yet been reached (NO in step S1014), the CPU 301 advances the processing to step S015 in order from the head of the unset paper list 1400 (in ascending occurrence order).

Here, in step S1015, the CPU 301 determines whether the paper ID of unset paper included in the occurrence order 1 of the unset paper list 1400 is being displayed as an unset object. For example, since the unset object includes a paper ID, the CPU 301 can determine whether the paper ID of unset paper is being displayed as an unset object by comparing the paper ID read out from the unset paper list 1400 with the paper ID of the unset object which is being displayed. If it is determined that the paper ID of unset paper is in an undisplayed state (YES in step S1015), the CPU 301 advances the processing to step S1016. If it is determined that the paper ID of unset paper is being displayed (NO in step S1015), the CPU 301 advances the processing to step S1018 to proceed with processing for the next occurrence order in the unset paper list 1400. Here, since no unset object is yet displayed, it is determined that the paper ID of unset paper is in an undisplayed state, so that the CPU 301 advances the processing to step S1016.

Furthermore, this processing is effective for a case where, for example, display processing is performed with respect to a plurality of jobs, as described below, and, for example, the same paper ID (0004) is present in the unset paper list 1420 as illustrated in FIG. 14C.

In step S1016, the CPU 301 calculates display start position coordinates of the unset object. For example, the CPU 301 can define starting point coordinates in the display region 402 as (X0, Y0), and can calculate and determine the display start position coordinates as (X0+Sx×n, Y0+Sy×n) according to the variable n, which indicates the display order, and the shift amounts Sx and Sy of the display position. Furthermore, the shift amounts Sx and Sy represent the amounts of shift in the X- and Y-coordinate directions, respectively. Here, the display start position coordinates of the (n=1)-th unset object 1318 are assumed to be (X0+Sx, Y0+Sy).

In step S1017, the CPU 301 performs control to display the n-th unset object on the external display device 113, n being a variable indicating the display order. For example, to display a plurality of unset objects in an overlapping manner, the CPU 301 performs display control in such a manner that an unset object is located in the foreground in ascending display order. Here, the CPU 301 performs control to display the (n=1)-th unset object 1318 with the display start position coordinates (X0+Sx, Y0+Sy) set as the starting point on the external display device 113. Accordingly, "recycled paper of A4 and 200 gsm", which corresponds to the paper ID (0004) of the occurrence order 1 in the unset paper list 1400 illustrated in FIG. 14A, is displayed with the display start position coordinates (X0+Sx, Y0+Sy) set as the starting point (see FIG. 13).

In step S1018, the CPU 301 increments the variable n, which indicates the display order, and then performs processing for displaying a next unset object. More specifically, the CPU 301 updates the variable n, which indicates the display order, to n=2. Then, the CPU 301 repeats processing in steps S1014 to S1018. In step S1014, it is determined that the end of the unset paper list 1400 has not yet been reached, so that the CPU 301 advances the processing to step S1015. In step S1015, it is determined that the paper ID (0002) of the next occurrence order 2 in the unset paper list 1400 is in an undisplayed state, so that the CPU 301 advances the processing to step S1016.

In step S1016, the CPU 301 calculates display start position coordinates (X0+Sx×2, Y0+Sy×2) of an unset object 1319 of the occurrence order 2. In step S1017, the CPU 301 performs control to display the unset object 1319 at the calculated display start position coordinates on the external display device 113. Accordingly, "single-sided coated paper of A4 and 105 gsm", which corresponds to the paper ID (0002) of the occurrence order 2 in the unset paper list 1400 illustrated in FIG. 14A, is displayed with the display start position coordinates (X0+Sx×2, Y0+Sy×2) set as the starting point. With regard to display orders of the unset objects 1318 and 1319, the unset object 1318 of the display order 1 is displayed closer to the foreground than the unset object 1319 of the display order 2. In other words, an unset object having the smaller display order corresponding to the occurrence order is displayed closer to the foreground.

Subsequently, the CPU 301 repeats processing in step S1014 to S1018 until the end of the unset paper list 1400 is reached. Here, in subsequent step S1018, the variable n, which indicates the occurrence order, in other words, the display order, reaches n=3, and, therefore, in step S1014, it is determined that the end of the unset paper list 1400 has been reached, so that the CPU 301 ends the display processing.

Furthermore, in a case where display processing for the unset paper list 1420 with respect to a plurality of jobs, for example, two jobs as illustrated in FIG. 14C, the CPU 301 proceeds with the processing as follows.

More specifically, the CPU 301 determines that, although, in subsequent step S1018, the variable n indicating the display order reaches n=3, the end of the unset paper list 1420 has not yet been reached in step S1014, and thus advances the processing to step S1015. In step S1015, the CPU 301 determines whether the paper ID of the next occurrence order 3 in the unset paper list 1420 is in an undisplayed state. Here, since the paper ID (0004) of the occurrence order 3 has already been displayed, the CPU 301 advances the processing to step S1018. In step S1018, the variable n, which indicates the display order, reaches n=4, and, therefore, in step S1014, it is determined that the end of the unset paper list 1420 has been reached, so that the CPU 301 ends the display processing.

Furthermore, in a case where a configuration in which, when the ID of unset paper detected in a job which is being analyzed is the same as the paper ID detected in another job which has been analyzed prior to that job, the paper ID is not additionally written to the unset paper list is employed, step S1015 can be omitted.

While, here, the image forming apparatus 103 sequentially performs analysis on all of the pages targeted for analysis of a job and sends an unset paper notification to the print control apparatus 102 after all of the types of unset paper have been detected, the present embodiment is not limited to this. For example, the image forming apparatus 103 can send an unset paper notification to the print control apparatus 102 each time unset paper is detected with respect to pages targeted for analysis of a job, sequentially store each unset paper notification in, for example, the RAM 302, and then generate an unset paper list.

Moreover, the image forming apparatus 103 can analyze setting information about all of the pages with respect to a job, determine respective display orders with respect to all of the unset objects, and, after the compete determination of display orders, communicate the display orders to the print control apparatus 102.

Next, paper setting processing performed by the paper management application, which runs on the print control apparatus 102, is described with reference to the flowchart of FIG. 12. Here, an example is described in which, in FIG. 13, the operator performs paper setting by dragging and dropping an unset object displayed in the display region 402 on the external display device 113 onto the corresponding paper feed stage button via, for example, the pointing device 115.

In FIG. 13, when the unset object 1318 in the foreground is dragged and dropped onto the button 406 of the paper feed stage 1, in step S1201, the CPU 301 determines whether the present processing is processing regarding unset paper. This is similar to the above-described processing in step S811 in the first embodiment, and the detailed description thereof is, therefore, omitted. If it is determined that the paper setting processing is processing regarding unset paper (YES in step S1201), the CPU 301 advances the processing to step S1202. If it is determined that the paper setting processing is other than processing regarding unset paper (for example, paper setting processing performed via the paper setting screen illustrated in FIG. 7) (NO in step S1201), the CPU 301 advances the processing to step S1204.

In step S1202, the CPU 301 deletes an ID coincident with paper targeted for the paper setting processing from the unset paper list. Here, the CPU 301 deletes the paper ID (0004) of the unset object 1318 and the job ID (0001) of the occurrence order 1 from the unset paper list 1400 illustrated in FIG. 14A, thus obtaining an unset paper list 1410 illustrated in FIG. 14B.

In step S1203, the CPU 301 refers to the unset paper list 1410 illustrated in FIG. 14B and performs display processing. Here, the CPU 301 deletes the unset object 1318 in the display region 402 illustrated in FIG. 13, thus displaying a screen in which only the unset object 1319 is displayed on the external display device 113.

In step S1204, as in step S814, the CPU 301 sets paper information about recycled paper of A4 and 200 gsm of the paper ID (0004) to the paper feed stage 1. Moreover, the CPU 301 updates display information about a paper feed stage button in paper information. Here, the CPU 301 updates display information about the paper feed stage button 406 with paper information about recycled paper of A4 and 200 gsm of the paper ID (0004). Accordingly, paper information for the paper feed stage 1, which is stored in the RAM 302 and the RAM 202, is changed to recycled paper of A4 and 200 gsm, and displaying of the paper feed stage button 406 in the image 405 illustrated in FIG. 13 is similarly changed.

After that, the unset object 1319 is dragged and dropped onto, for example, the button 411 of the paper feed stage 6. Then, the CPU 301 deletes the paper ID (0002) of the unset object 1319 and the job ID (0001) of the occurrence order 1 from the unset paper list 1410 illustrated in FIG. 14B in a way similar to the above-described way. Next, the CPU 301 deletes the unset object 1319 in the display region 402 illustrated in FIG. 13, and sets paper information about single-sided coated paper of A4 and 105 gsm of the paper ID (0002) to the paper feed stage 6. Moreover, the CPU 301 updates display information about a paper feed stage button in paper information. Here, the CPU 301 updates display information about the paper feed stage button 411 with paper information about single-sided coated paper of A4 and 105 gsm of the paper ID (0002). Accordingly, paper information for the paper feed stage 6, which is stored in the RAM 302 and the RAM 202, is changed to single-sided coated paper of A4 and 105 gsm, and displaying of the paper feed stage button 411 in the image 405 illustrated in FIG. 13 is similarly changed.

The above is the description about the processing performed from the time when a plurality of unset objects is displayed in response to reception of the unset paper notification to the time when paper setting with respect to all of the unset objects is performed by a paper setting operation and all of the unset objects disappear from the top screen. With this, when out of paper caused by paper being unset occurs with respect to a plurality of types of paper, the operator is allowed to perform paper setting with respect to all of the types of unset paper by sequentially dragging and dropping the unset objects for paper setting. In that case, the unset objects are sequentially displayed from the foreground according to the orders of jobs and pages. Therefore, when there is a plurality of unset objects, the operator is able to intuitively recognize which paper is to be set first and is able to easily perform setting of paper to be set.

In the present embodiment, when out of paper caused by paper being unset occurs with respect to a plurality of types of paper, the operator can perform a paper setting operation in the top screen 401 of the paper management application illustrated in FIG. 9. In other words, the operator is not required to perform such a troublesome operation as to perform paper setting by touching a paper feed stage button corresponding to a paper feed stage targeted for paper setting in the top screen 401 illustrated in FIG. 9 to open the top screen 701 of the paper setting screen illustrated in FIG. 7. Accordingly, even in the present embodiment, the operability and convenience of a paper setting operation by the operator when out of paper caused by paper being unset occurs are refined.

<Paper Setting Processing at the Time of Job Cancel>

Next, processing which is performed in a case where, when performing paper setting processing, the operator has canceled a job including an unset paper object on the operation panel 205 of the image forming apparatus 103 is described with reference to the flowchart of FIG. 15.

Here, as a prerequisite, a condition in which an instruction for printing of three jobs is issued to the image forming apparatus 103 is assumed. Moreover, in first and third jobs (for example, the job IDs thereof being 0001 and 0003, respectively), recycled paper of A4 and 200 gsm (the paper ID thereof being 0004) is assumed to be set as paper to be used. In a second job (the job IDs thereof being 0002), single-sided coated paper of A4 and 105 gsm (the paper ID thereof being 0002) is assumed to be set as paper to be used. Furthermore, it is assumed that neither of the types of paper set in the first to third jobs is set to any paper feed stage, and, additionally, it is assumed that the designation of a paper feed stage is not performed with respect to the first to third jobs.

Here, a condition is described in which, while displaying unset objects on the screen illustrated in FIG. 13 upon receiving an unset paper notification concerning the first to third jobs, the print control apparatus 102 has received a job cancel instruction from the operation panel 205 of the image forming apparatus 103. Furthermore, as an unset paper list corresponding to the unset paper notification, an unset paper list 1430 illustrated in FIG. 14D is assumed to be retained in the RAM 302.

First, in step S1511, the CPU 301 determines whether a job cancel notification has been received from the image forming apparatus 103. If it is determined that the job cancel notification has been received (YES in step S1511), the CPU 301 advances the processing to step S1512. If it is determined that the job cancel notification has not been received (NO in step S1511), the CPU 301 ends the present processing. Here, since, as the job cancel notification, for example, a job cancel notification for the first job is assumed to have been received, the CPU 301 advances the processing to step S1512.

In step S1512, the CPU 301 determines whether unset paper for the job ID of a job which has been canceled is included in the unset paper list 1430. If it is determined that the job ID of a job which has been canceled is present in the unset paper list 1430 (YES in step S1512), the CPU 301 advances the processing to step S1513. If it is determined that the job ID of a job which has been canceled is not present in the unset paper list 1430 (NO in step S1512), the CPU 301 ends the present processing. Here, since, as a result of referring to the unset paper list 1430, the job ID 0001 of the first job, which has been canceled, is present, the CPU 301 advances the processing to step S1513.

In step S1513, the CPU 301 deletes the job ID and the paper ID for the job which has been canceled from the unset paper list 1430. Here, the CPU 301 deletes the job ID 0001 and the paper ID corresponding thereto from the unset paper list 1430, thus generating an unset paper list 1440 (see FIG. 14E). Then, the CPU 301 advances the processing to step S1514.

If the result of determination in step S1511 or S1512 is NO, displaying of three unset objects which are based on the unset paper list 1430 illustrated in FIG. 14D is maintained.

On the other hand, in step S1514, the CPU 301 refers to the unset paper list 1440 illustrated in FIG. 14E and performs the display processing illustrated in FIG. 10B. More specifically, first, in step S1011, all of the unset objects which are currently displayed in the screen illustrated in FIG. 13 are deleted. Then, as processing in steps S1012 to S1018 is repeated, unset objects in the unset paper list 1440 are sequentially displayed. Accordingly, here, the unset object (the paper ID (0004) and the job ID (0001)) which has been displayed in the foreground up to now and has been subjected to an instruction for job cancellation is deleted. On the other hand, the unset object 1319 (the paper ID (0002) and the job ID (0002)) which has been displayed second closest to the foreground up to now is displayed in the foreground, and the unset object 1318 (the paper ID (0004) and the job ID (0003) is displayed behind the unset object 1319.

<Paper Setting Processing not Caused by Out of Paper>

Next, paper setting processing which is performed in a condition in which out of paper is not occurring is described with reference to the flowchart of FIG. 8B. As a prerequisite for description, here, paper setting processing is performed in a condition in which out of paper is not occurring and printing is not in progress.

In this condition, first, when the operator touches a button for a paper feed stage targeted for paper setting in the image 405 illustrated in FIG. 4A, for example, the button 406 of the paper feed stage 1, the top screen 701 of the paper setting screen illustrated in FIG. 7 is displayed in response to such touching. Then, the CPU 301 determines that the paper setting processing is not setting of unset paper regarding a job but paper setting processing using the paper setting screen illustrated in FIG. 7 (NO in step S811), and thus advances the processing to step S814.

In the top screen 701 of the paper setting screen illustrated in FIG. 7, for example, recycled paper of A4 and 200 gsm is selected from the paper list display region 703 by the operator, and the allocation button 704 is then touched to perform paper setting. Then, in step S814, the CPU 301 acquires paper information from the RAM 302 with the paper ID set in the paper setting screen illustrated in FIG. 7 used as a key, and sets the acquired paper information to the paper feed stage 1. Here, paper information about recycled paper of A4 and 200 gsm of the paper ID (0004) is set to the paper feed stage 1. More specifically, the paper information for the paper feed stage 1 stored in the RAM 302 is changed to recycled paper of A4 and 200 gsm, and displaying of the paper feed stage button 406 in the image 405 illustrated in FIG. 4A is changed in a similar way. Moreover, the changed paper information for the paper feed stage 1 is communicated to the image forming apparatus 103 and is then reflected in the paper information for the paper feed stage 1 stored in the RAM 202.

Next, paper setting processing which is performed with respect to a plurality of types of paper in a condition in which out of paper is not occurring is described with reference to the flowchart of FIG. 12. As a prerequisite for description, similarly to the above description, paper setting processing is performed in a condition in which out of paper is not occurring and printing is not in progress.

In this condition, first, when the operator touches a button for a paper feed stage targeted for paper setting in the image 405 illustrated in FIG. 4A, for example, the button 406 of the paper feed stage 1, the top screen 701 illustrated in FIG. 7 is displayed in response to such touching. Then, the CPU 301 determines that the paper setting processing is not setting of unset paper regarding a job but paper setting processing using the paper setting screen illustrated in FIG. 7 (NO in step S1201), and thus advances the processing to step S1204.

In the top screen 701 of the paper setting screen illustrated in FIG. 7, for example, recycled paper of A4 and 200 gsm is selected from the paper list display region 703 by the operator, and the allocation button 704 is then touched to perform paper setting. Then, in step S1204, as in step S814 described above, paper information about recycled paper of A4 and 200 gsm of the paper ID (0004) is set to the paper feed stage 1. More specifically, the paper information for the paper feed stage 1 stored in the RAM 302 is changed to recycled paper of A4 and 200 gsm, and displaying of the paper feed stage button 406 in the image 405 illustrated in FIG. 4A is changed in a similar way. Moreover, the changed paper information for the paper feed stage 1 is communicated to the image forming apparatus 103 and is then reflected in the paper information for the paper feed stage 1 stored in the RAM 202.

Subsequently, the operator touches a button for a paper feed stage targeted for paper setting in the image 405 illustrated in FIG. 4A, for example, the button 411 of the paper feed stage 6. Next, in the top screen 701, the operator selects, for example, single-sided coated paper of A4 and 105 gsm from the paper list display region 703 and then touches the allocation button 704. Then, in a way similar to the above description, in step S1204, paper information about single-sided coated paper of A4 and 105 gsm of the paper ID (0002) is set to the paper feed stage 6. More specifically, the paper information for the paper feed stage 6 stored in the RAM 302 is changed to single-sided coated paper of A4 and 105 gsm, and displaying of the paper feed stage button 411 in the image 405 illustrated in FIG. 4A is changed in a similar way. Moreover, the changed paper information for the paper feed stage 6 is communicated to the image forming apparatus 103 and is then reflected in the paper information for the paper feed stage 6 stored in the RAM 202.

In the description of each of the above-described embodiments, paper setting is allowed to be performed on any paper feed stage by dragging and dropping an unset object via, for example, the pointing device 115. However, a configuration can be employed in which, in a case where another type of paper to be used is already set to a paper feed stage serving as a paper setting destination, the CPU 301 is not allowed to perform paper setting on the paper feed stage subjected to previous paper setting. For example, with respect to all of the buttons for paper feed stages subjected to previous paper setting, their setting change enabled or disabled states can be automatically switched to a setting change inhibited state, thus disabling changing of paper setting.

Moreover, while, in each of the above-described embodiments, a case in which the designation of a paper feed stage is not performed with respect to each job has been described, in a case where a paper feed stage is previously designated, the paper feed stage serving as a paper setting destination is definite. Accordingly, in that case, the ID of the designated paper feed stage can be included in an out of paper notification or an unset paper notification. Furthermore, information about the paper feed stage ID can be included in an unset object to be displayed. Moreover, in that case, when an unset object is dragged, the CPU 301 can make all of the paper feed stage buttons other than a paper feed stage button of the corresponding paper feed stage ID grayed out and make only the paper feed stage button available for paper setting highlighted. Furthermore, a configuration can be employed in which the operator only has to touch an unset object via, for example, the pointing device 115 and the CPU 301 automatically performs paper setting on the paper feed stage button of the corresponding paper feed stage ID using paper information about the unset object.

Moreover, while, in the above-described embodiments, when there is a plurality of unset objects, an unset object having the smaller display order corresponding to the occurrence order is displayed closer to the foreground, the embodiments are not limited to this display method. More specifically, for example, various methods, such as a display method of making the setting order explicit, for example, displaying the setting order regarding a paper feed stage at each unset object, or a method of guiding the setting order via a voice guide, can be employed.

Furthermore, while, in the description of the above-described embodiments, the paper management application is an application which runs on the print control apparatus 102, the embodiments are not limited to this. For example, the paper management application can be configured to operate in the client computer 101 or the image forming apparatus 103 to attain a similar function effect.

In the above-described embodiments, an example is applied to the print management system 100, which includes the image forming apparatus 103 and the print control apparatus 102 as illustrated in FIG. 1, has been described. However, the present disclosure is not limited to this, but can be applied to a print management system in which an image forming apparatus and a print control apparatus are integrated with each other.

Moreover, the present disclosure can be applied to another type of image forming apparatus, such as another type of digital multifunction peripheral, as long as it is configured to attain a function similar to that of the print management system in the above-described embodiments.

The present disclosure can also be implemented by processing for supplying a program for implementing one or more functions of the above-described embodiments to a system or apparatus via a network or a storage medium and causing one or more processors included in a computer of the system or apparatus to read and execute the program. Moreover, the present disclosure can also be implemented by a circuit which implements one or more functions (for example, an application specific integrated circuit (ASIC)).

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-135497, filed Jul. 11, 2017, which is hereby incorporated by reference herein in its entirety.

What is claimed is:

1. A print management system including an image forming apparatus and a control apparatus to communicate with the image forming apparatus via a network, the control apparatus comprising:
a processor and a memory storing instructions that, when the instructions are executed by the processor, cause the processor to function as:
an obtaining unit configured to obtain setting of paper type information for one or more paper feeding units from the image forming apparatus,
a detection unit configured to detect whether paper type information set to a print job is included in the setting of paper type information for the one or more paper feeding units obtained by the obtaining unit,
a display control unit configured to control display, on a display device, of a setting screen including a display object to set the paper type information which is related to the detection by the detecting unit in which paper type information set to the print job is not included in the setting of paper type information for a paper feeding unit in a case where the paper type information set to the print job is not included in a setting of the paper type information for the paper feeding unit, and
a setting unit configured to control displaying a setting screen accepting a user's setting of the paper type information displayed on the display device in accordance with operation of the display object and to transfer, via the network, the accepted setting to the paper feeding unit of the image forming apparatus,
wherein the detection unit detects an obtained first paper type information and an obtained second paper type information set to print jobs does not include paper type information for the one or more paper feeding units, and then the display control unit controls display of information about a second type of unset paper in a foreground on the display device after information about a first paper type of unset paper is allocated to a paper feed unit.

2. The print management system according to claim 1, wherein the detection unit, the display control unit, and the setting unit are included in the control apparatus and plural display objects are displayed on the display device and selection of one of the display objects and selection of one object representing one of the paper feeding units of the image forming apparatus cause association between the paper type information which is related to the detection and the one of the paper feeding units.

3. The print management system according to claim 1, wherein the setting unit allocates, in the same screen as a screen in which paper information is being displayed on the display device, the paper information to one of a plurality of paper feed stages of the image forming apparatus.

4. The print management system according to claim 3, wherein the setting unit allocates, in the same screen as a screen in which paper information is being displayed on the display device, the paper information to one of a plurality of paper feed stages of the image forming apparatus by performing drag and drop.

5. The print management system according to claim 1, wherein, in a case where neither the information about the first type of unset paper nor the information about the second type of unset paper is allocated to any of a plurality of paper feed units of the image forming apparatus, the display control unit controls display of information about the first type of unset paper in the foreground on the display device and displays on the display device information about the second type of unset paper, which becomes secondly needed, behind the information about the first type of unset paper based on a setting condition of the print job.

6. The print management system according to claim 5, wherein the setting unit allocates, on a screen in which paper information is being displayed on the display device, information about unset paper which is being displayed in a foreground on the display device to one of a plurality of paper feed stages of the image forming apparatus by performing drag and drop.

7. The print management system according to claim 5, wherein, in a case where, after paper information about a plurality of print jobs is detected by the detection unit and information about unset paper with respect to each of the plurality of print jobs is allocated to a paper feed stage by the setting unit, one print job is canceled, the setting unit deletes information about unset paper included in the canceled print job on the screen.

8. The print management system according to claim 1, wherein, in a case where the paper type information includes information about a plurality of types of unset paper which is not allocated to any of a plurality of paper feed stages of the image forming apparatus, the display control unit controls display of the information about the plurality of types of unset paper on the screen in such a manner that an order in which the plurality of types of unset paper becomes needed is made explicit.

9. A method for a print management system including an image forming apparatus and a control apparatus, the method comprising:
detecting paper information which is set with respect to a print job;
displaying the detected paper information on a display device; and
controlling processing for displaying a setting screen used to allocate the paper information displayed on the display device to a paper feed stage of the image forming apparatus on a screen of the display device,
wherein, in a case where paper type information includes information about a first type of unset paper and information about a second type of unset paper, neither of which is allocated to any of a plurality of paper feed units of the image forming apparatus, controlling display includes controlling display of the information about the second type of unset paper in a foreground on the display device after the information about the first type of unset paper is allocated to a paper feed stage.

10. A non-transitory computer-readable storage medium storing a program to cause a computer to perform a method for a print management system including an image forming apparatus and a control apparatus, the method comprising:
detecting paper information which is set with respect to a print job;
displaying the detected paper information on a display device; and
controlling processing for displaying a setting screen used to allocate the paper information displayed on the display device to a paper feed stage of the image forming apparatus on a screen of the display device,
wherein, in a case where paper type information includes information about a first type of unset paper and information about a second type of unset paper, neither of which is allocated to any of a plurality of paper feed units of the image forming apparatus, controlling display includes controlling display of the information about the second type of unset paper in a foreground on the display device after the information about the first type of unset paper is allocated to a paper feed stage.

11. A control apparatus to communicate with an image forming apparatus, the control apparatus comprising:
a display device;
a processor and a memory storing instructions that, when the instructions are executed by the processor, cause the processor to perform operations including:
obtaining setting of paper type information for a paper feeding unit from the image forming apparatus,
detecting whether paper type information set to a print job is included in the obtained setting of paper type information for the paper feeding unit,
controlling display, on the display device, of a setting screen including a display object to set the paper type information which is related to the detection by the detecting in which paper type information set to the print job is not included in the setting of paper type information for the paper feeding unit in a case where the paper type information set to the print job is not included in a setting of the paper type information for the paper feeding unit, and
controlling displaying a setting screen accepting a user's setting of the paper type information displayed on the display device in accordance with operation of the display object and to transfer, via a network, the accepted setting to the paper feeding unit of the image forming apparatus,
wherein, in a case where the paper type information includes information about a first type of unset paper and information about a second type of unset paper, neither of which is allocated to any of a plurality of paper feed units of the image forming apparatus, controlling display includes controlling display of the information about the second type of unset paper in a foreground on the display device after the information about the first type of unset paper is allocated to a paper feed stage.

12. The control apparatus according to claim 11, wherein plural display objects are displayed on the display device and selection of one of the display objects and selection of one object representing one of the paper feeding units of the image forming apparatus cause association between the paper type information which is related to the detection and the one of the paper feeding units.

13. A method for a control apparatus having a display device and configured to communicate with an image forming apparatus, the method comprising:
obtaining setting of paper type information for one or more paper feeding units from the image forming apparatus;
detecting whether paper type information set to a print job is included in the obtained setting of paper type information for the one or more paper feeding units;
controlling display, on the display device, of a setting screen including a display object to set the paper type information which is related to the detection by the detecting in which paper type information set to the print job is not included in the setting of paper type information for a paper feeding unit in a case where the paper type information set to the print job is not included in a setting of the paper type information for the paper feeding unit; and
controlling displaying a setting screen accepting a user's setting of the paper type information displayed on the display device in accordance with operation of the display object and to transfer, via a network, the accepted setting to the paper feeding unit of the image forming apparatus,
wherein detecting includes detecting an obtained first paper type information and an obtained second paper type information set to print jobs does not include paper type information for the one or more paper feeding units, and then controlling includes controlling display of information about a second type of unset paper in a foreground on the display device after information about a first paper type of unset paper is allocated to a paper feed unit.

14. The method according to claim 13, wherein plural display objects are displayed on the display device and selection of one of the display objects and selection of one object representing one of the paper feeding units of the image forming apparatus cause association between the paper type information which is related to the detection and the one of the paper feeding units.

* * * * *